US007912944B2

(12) United States Patent
Nagai et al.

(10) Patent No.: US 7,912,944 B2
(45) Date of Patent: Mar. 22, 2011

(54) INFORMATION PROCESSING APPARATUS, PROCESS CONTROL METHOD, AND PROCESS CONTROL PROGRAM PRODUCT

(75) Inventors: Keiji Nagai, Kanagawa (JP); Yutaka Nakamura, Kanagawa (JP); Koji Dan, Kanagawa (JP); Masato Takahashi, Kanagawa (JP); Yuuki Inoue, Chiba (JP); Shogo Hyakutake, Kanagawa (JP); Fujio Takahashi, Tokyo (JP); Yoshiaki Murata, Kanagawa (JP); Kenichi Takeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 11/802,545

(22) Filed: May 23, 2007

(65) Prior Publication Data

US 2008/0010306 A1 Jan. 10, 2008

(30) Foreign Application Priority Data

May 31, 2006 (JP) ................................ 2006-152181
Mar. 30, 2007 (JP) ................................ 2007-093636

(51) Int. Cl.
*G06F 15/173* (2006.01)

(52) U.S. Cl. ......................... 709/224; 709/219; 709/249

(58) Field of Classification Search .................. 709/219, 709/224, 249
See application file for complete search history.

(56) References Cited

U.S. PATENT DOCUMENTS 6,035,264 A * 3/2000 Donaldson et al. ........... 702/182
6,182,249 B1 1/2001 Wookey et al.
6,370,341 B1 4/2002 Haines
6,529,692 B1 3/2003 Haines et al.
2003/0212929 A1 11/2003 Sekizawa
2004/0153675 A1 8/2004 Dorn et al.
2005/0108075 A1 * 5/2005 Douglis et al. .................... 705/8
2007/0220490 A1 * 9/2007 Kobayashi et al. ........... 717/124

FOREIGN PATENT DOCUMENTS

GB 2 341 698 3/2000
JP 10-198236 7/1998
JP 10-198569 7/1998
JP 2003-345560 12/2003
JP 2005-190490 7/2005

OTHER PUBLICATIONS

Clark H et al, "DAWGS-A Distributed Compute Server Utilizing Idle Workstations", vol. 2, Apr. 8, 1990, pp. 732-741.
Ianzini F. et al. "The Large Scale Digital Cell Analysis System and its Use in the Quantitative Analysis of Cell Populations", Jul. 8, 2002, pp. 470-475.
Partial European Search Report, Jun. 8, 2009.

* cited by examiner

*Primary Examiner* — Michael Won
(74) *Attorney, Agent, or Firm* — Dickstein Shapiro LLP

(57) ABSTRACT

A disclosed information processing apparatus includes an information processing unit configured to operate as a daemon process; an information displaying unit configured to operate as a process different from the daemon process and display a screen relevant to the information processing unit; a first ending unit configured to end the information displaying unit due to a first factor; and a second ending unit configured to end the information displaying unit due to a second factor different from the first factor. The information displaying unit ends the information processing unit in the event of receiving a request to end from the first ending unit and the information displaying unit does not end the information processing unit in the event of receiving a request to end from the second ending unit.

16 Claims, 22 Drawing Sheets

FIG.5

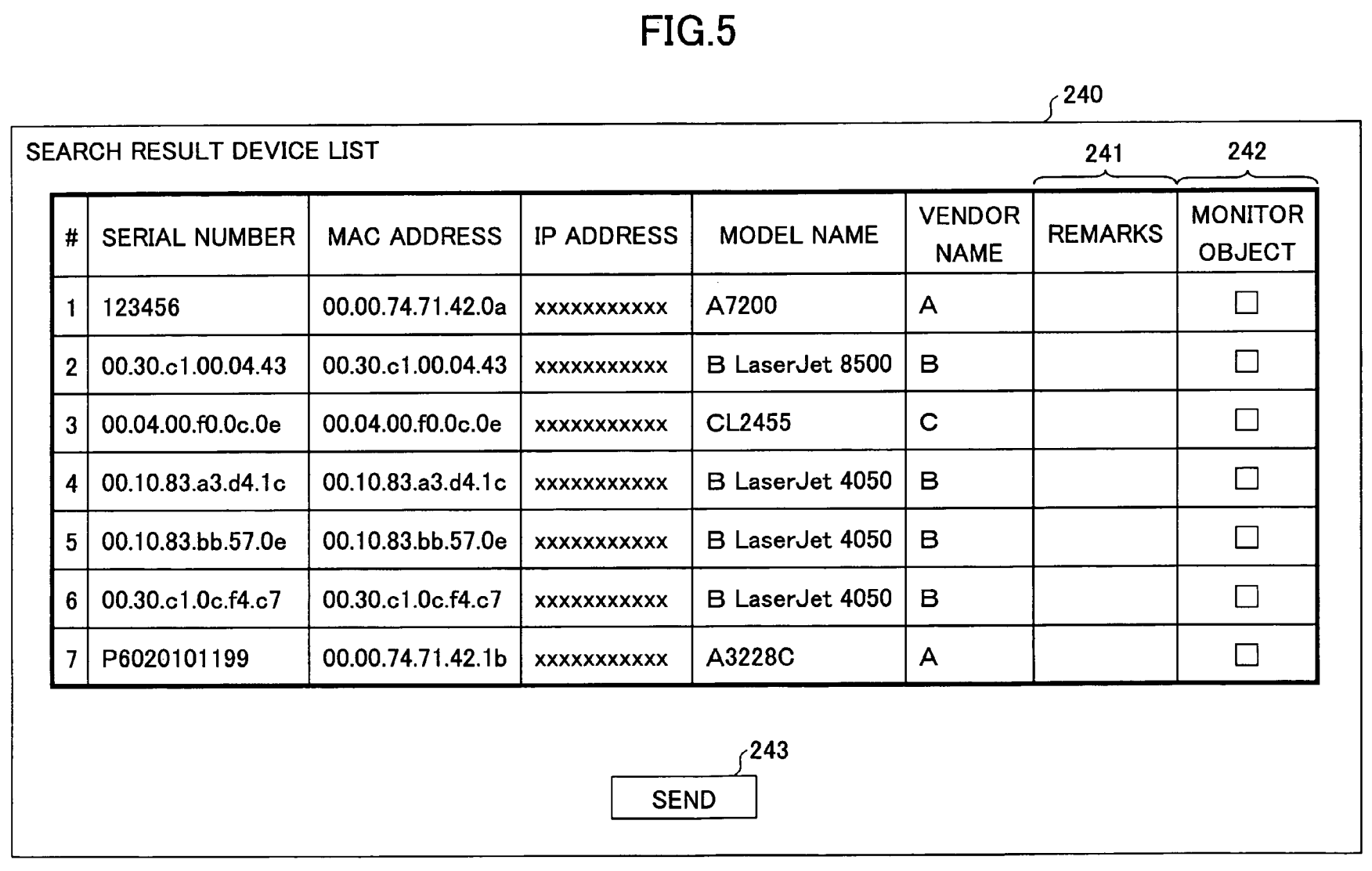

240

SEARCH RESULT DEVICE LIST 241 242

| # | SERIAL NUMBER | MAC ADDRESS | IP ADDRESS | MODEL NAME | VENDOR NAME | REMARKS | MONITOR OBJECT |
|---|---|---|---|---|---|---|---|
| 1 | 123456 | 00.00.74.71.42.0a | xxxxxxxxxxx | A7200 | A | | ☐ |
| 2 | 00.30.c1.00.04.43 | 00.30.c1.00.04.43 | xxxxxxxxxxx | B LaserJet 8500 | B | | ☐ |
| 3 | 00.04.00.f0.0c.0e | 00.04.00.f0.0c.0e | xxxxxxxxxxx | CL2455 | C | | ☐ |
| 4 | 00.10.83.a3.d4.1c | 00.10.83.a3.d4.1c | xxxxxxxxxxx | B LaserJet 4050 | B | | ☐ |
| 5 | 00.10.83.bb.57.0e | 00.10.83.bb.57.0e | xxxxxxxxxxx | B LaserJet 4050 | B | | ☐ |
| 6 | 00.30.c1.0c.f4.c7 | 00.30.c1.0c.f4.c7 | xxxxxxxxxxx | B LaserJet 4050 | B | | ☐ |
| 7 | P6020101199 | 00.00.74.71.42.1b | xxxxxxxxxxx | A3228C | A | | ☐ |

243

SEND

FIG.7

| STRUCTURE OF SPECIFICATION INFORMATION |
| --- |
| URL OF ORDER SUPPORT SERVER |
| USER ID |
| PASSWORD |
| IP ADDRESS OF PROXY SERVER |
| PORT NUMBER OF PROXY SERVER |
| AUTHENTICATION INFORMATION FOR PROXY SERVER (USER NAME) |
| AUTHENTICATION INFORMATION FOR PROXY SERVER (PASSWORD) |

FIG.8
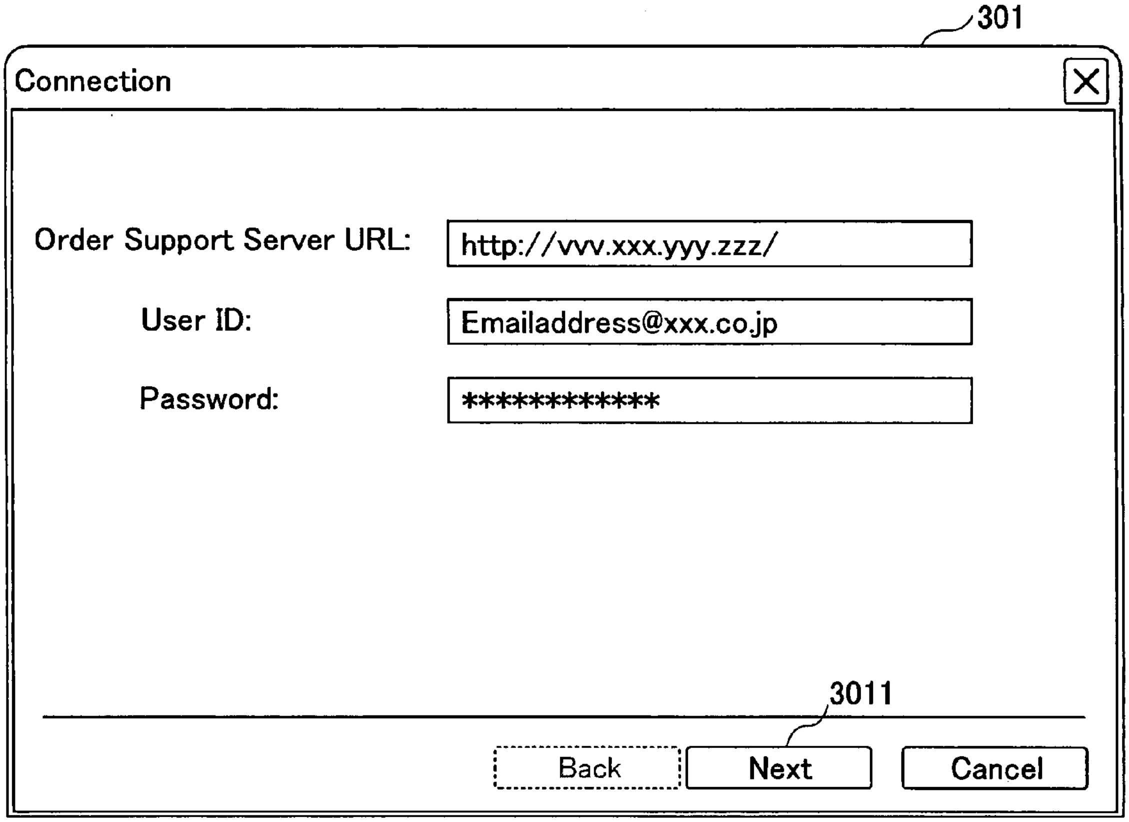
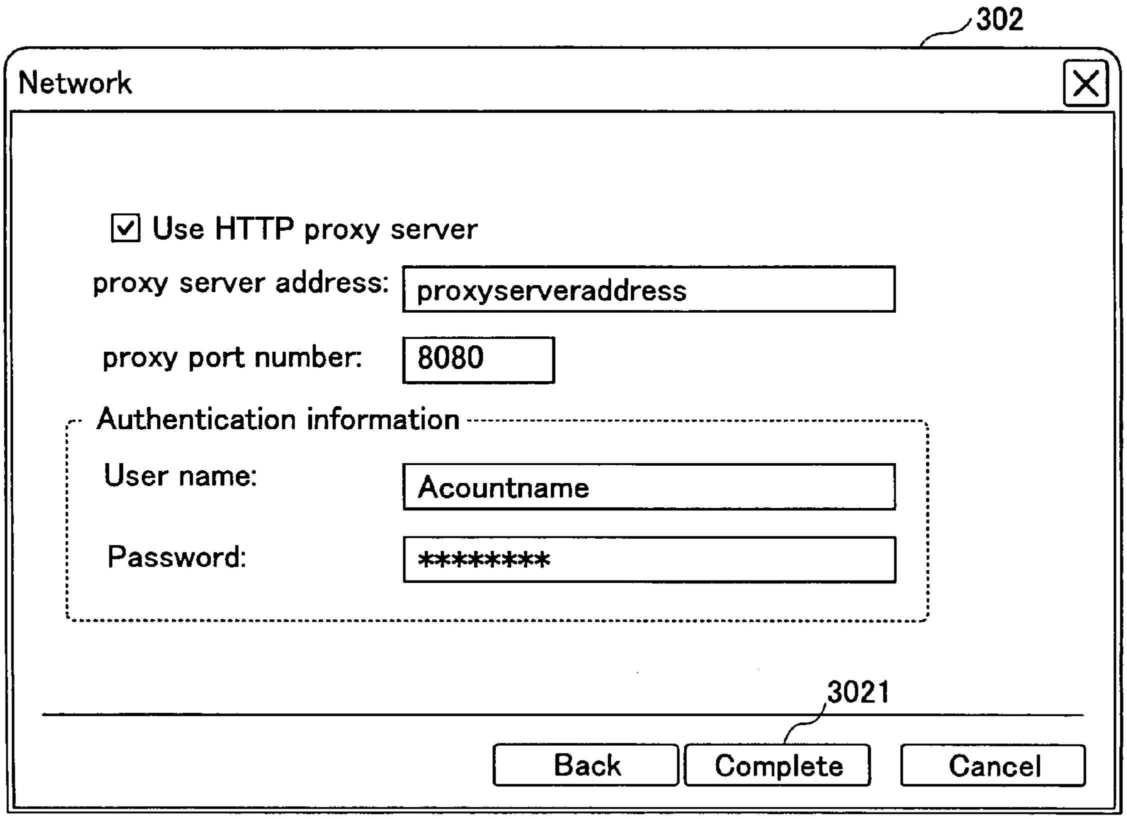

FIG.11

| REPORT INFORMATION | REMARKS | SUPPLEMENT |
|---|---|---|
| [ Header ] | 【Header information】 | |
| Date&Time | Date and time | |
| User ID | User ID for sending to server | Information for identifying user |
| Password | Password for sending to server | |
| | | |
| [ Device Info ] | 【Device information】 | |
| Vendor name | Vendor name of device | |
| Model name | Model name of device | |
| Serial Number | Serial number | |
| Mac Address | MAC address | |
| IP Address | IP address | |
| Toner ID | Toner ID | |
| Toner Name | Toner name | |
| Toner Status | Toner status | |
| Toner Level | Toner level | |
| Toner Name Localized | Toner name (character string) | |
| Toner Name Localized Code | Toner name (code) | |
| Total Counter | Total counter value | |
| Monochrome Counter | Monochrome counter value | (*1) |
| Color Counter | Color counter value | (*1) |
| Cyan Counter | Cyan counter value | (*1) |
| Magenta Counter | Magenta counter value | (*1) |
| Yellow Counter | Yellow counter value | (*1) |
| Black Counter | Black counter value | (*1) |
| Red Counter | Red counter value | (*1) |

FIG.13

260

Order Page

A consumable element is lacking in the following device.

| Manufacturer name | Model name | Serial No. | Remarks |
|---|---|---|---|
| A | A 7200 | 123456 | 6F South side |

261

Lacking consumable element

A IP toner (Yellow)

261A

Please specify the necessary quantity of consumable elements.

※ A brief description of the product will appear by clicking the product name.

262

| Product name | Product code | Unit price exclusive of tax | Quantity | Total |
|---|---|---|---|---|
| A IP toner (Cyan) | 636341 | ¥27,000 | 0 | ¥0 |
| A IP toner (Magenta) | 636340 | ¥27,000 | 0 | ¥0 |
| A IP toner (Yellow) | 636339 | ¥27,000 | 1 (2621) | ¥28,350 |
| A IP toner (Black) | 636338 | ¥32,000 | 0 | ¥0 |
| A Developing unit color type 7200 | 509626 | ¥22,500 | 0 | ¥0 |
| A Fixing oil unit type 7200 | 509259 | ¥6,000 | 0 | ¥0 |
| | | | Total | ¥28,350 |

Order ~2622

Purchase history of consumables elements for AA 7200 (S/N:123456)

| | | | |
|---|---|---|---|
| 2005/12/10 | A IP toner (Cyan) | 1 pc. | Ordered |
| 2005/11/21 | A IP toner (Magenta) | 1 pc. | Delivered |
| 2005/09/30 | A IP toner (Black) | 1 pc. | Delivered |

263

INFORMATION PROCESSING APPARATUS, PROCESS CONTROL METHOD, AND PROCESS CONTROL PROGRAM PRODUCT

BACKGROUND OF THE INVENTION

1. Field of the Invention

The present invention relates generally to information processing apparatuses, process control methods, and process control program products, and more particularly to an information processing apparatus, a process control method, and a process control program product for controlling the start-up and the end of a program.

2. Description of the Related Art

In company offices, plural devices such as printers, copiers, fax machines, or multifunction peripherals realizing functions of such devices in a single housing are interconnected via a communication network.

Each of these devices includes consumable elements that are consumed by using the device. The function of the device can be maintained by appropriately replacing such a consumable element. For example, in the case of a printer, toner, a fixing unit, a toner eject bottle, a photoconductor, and a developer correspond to consumable elements, which are generally referred to as supplies.

It is difficult to determine the extent to which a supply is consumed from the outside of a device. The only way a user can acknowledge that there is no toner remaining is by receiving an error message after sending an instruction to perform a printing operation. The user replaces a toner cartridge upon receiving the error message. In order to reduce the workload inflicted on the user, the following techniques have been proposed. One approach is to detect the service life of the supply inside the device. The detected information on the supply is displayed on an operations panel or printed out on a sheet of paper. Another approach is to cause the device to send a signal outside indicating that, the supply needs to be replaced, so that a maintenance person is dispatched to the office where the device is installed. Yet another approach is to cause the printer driver to send outside an order command according to the remaining amount of supply.

Patent Document 1: Japanese Laid-Open Patent Application No. H10-198236

Patent Document 2: Japanese Laid-Open Patent Application No. 2003-345560

Patent Document 3: UK Patent Application Publication No. GB 2341698

However, even if the service life of a supply can be detected, if the user is to order the supply and replace the supply, the user needs to take the trouble of correctly confirming the model number of the supply to be replaced and place an order. Furthermore, even when the user wants to make the order before the supply finishes, the timing at which an order can be made may depend on the business hours of the vendor. Moreover, labor costs and delivery costs arise for making an order.

Even if the printer driver can automatically make an order, the following problem arises. That is, even if the printer is seldom used or if the user is intending to stop using the printer, an order is automatically made according to the remaining amount of supply. Thus, even when the user is no longer intending to use the printer or when there is no need to replace the supply, the printer driver may automatically order a supply counter to the user's intention.

SUMMARY OF THE INVENTION

The present invention provides a an information processing apparatus, a process control method, and a process control program product in which one or more of the above-described disadvantages are eliminated.

A preferred embodiment of the present invention provides an information processing apparatus, a process control method, and a process control program product capable of appropriately controlling the start-up and the end of a computer program.

An embodiment of the present invention provides an information processing apparatus including an information processing unit configured to operate as a daemon process; and an information displaying unit configured to operate as a process different from the daemon process and display a screen relevant to the information processing unit; wherein as the information displaying unit is started up, the information displaying unit starts up the information processing unit.

An embodiment of the present invention provides an information processing apparatus including an information processing unit configured to operate as a daemon process; an information displaying unit configured to operate as a process different from the daemon process and display a screen relevant to the information processing unit; a first ending unit configured to end the information displaying unit due to a first factor; and a second ending unit configured to end the information displaying unit due to a second factor different from the first factor; wherein the information displaying unit ends the information processing unit in the event of receiving a request to end from the first ending unit and the information displaying unit does not end the information processing unit in the event of receiving a request to end from the second ending unit.

An embodiment of the present invention provides a process control method executed by a computer, the process control method including a first start-up step of starting up an information processing program configured to operate as a daemon process; and a second start-up step of starting up an information displaying program configured to operate as a process different from the daemon process and display a screen relevant to the information processing program; wherein in the second start-up step, the information displaying program executes the first start-up step.

An embodiment of the present invention provides a process control method executed by a computer, the process control method including a first start-up step of starting up an information processing program configured to operate as a daemon process; a second start-up step of starting up an information displaying program configured to operate as a process different from the daemon process and display a screen relevant to the information processing program; a first ending step of ending the information displaying program due to a first factor; and a second ending step of ending the information displaying program due to a second factor different from the first factor; wherein the information displaying program has a function of ending the information processing program in the event of receiving a request to end in the first ending step and the information displaying program has a function of not ending the information processing program in the event of receiving a request to end in the second ending step.

According to one embodiment of the present invention, an information processing apparatus, a process control method, and a process control program product capable of appropriately controlling the start-up and the end of a computer program are provided.

BRIEF DESCRIPTION OF THE DRAWINGS

Other objects, features and advantages of the present invention will become more apparent from the following detailed description when read in conjunction with the accompanying drawings, in which:

FIG. 5 is an example of a displayed search result device list page;

FIG. 7 is an example of the structure of install specification information saved in a specification information file;

FIG. 8 is an example of a specification screen displayed with the install specification information specified;

FIG. 11 is an example of the structure of shortage report information;

FIG. 13 is an example of an order page;

DETAILED DESCRIPTION OF THE PREFERRED EMBODIMENTS

A description is given, with reference to the accompanying drawings, of an embodiment of the present invention.

Figure 1:
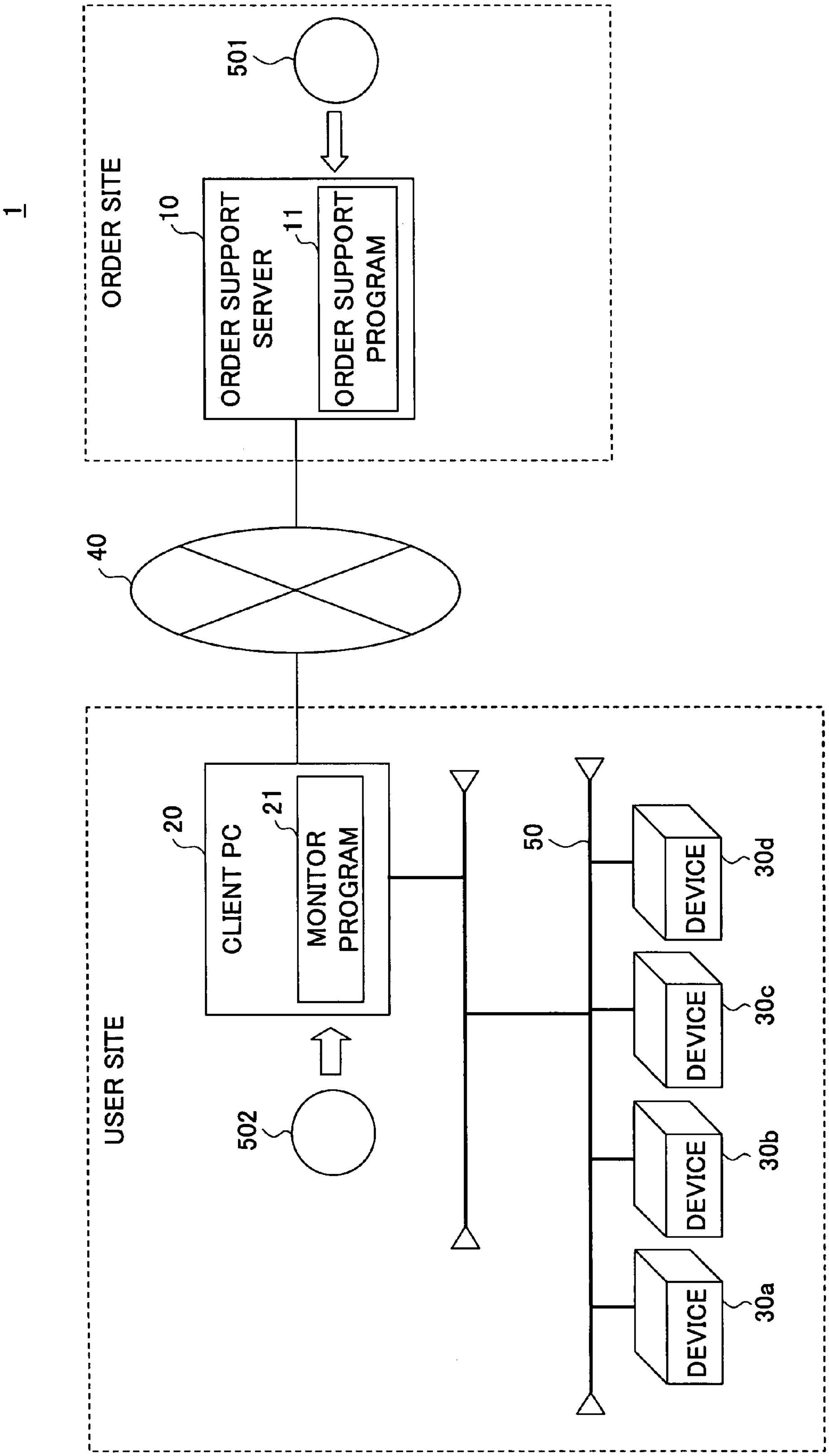
FIG. 1 is a schematic diagram of an order support system according to an embodiment of the present invention.

FIG. 1 is a schematic diagram of an order support system according to an embodiment of the present invention. As shown in FIG. 1, an order support system 1 includes an order support server 10, a client PC 20, and devices 30*a*, 30*b*, 30*c*, and 30*d* (hereinafter also collectively referred to as "device 30"). The order support server 10 is installed at an order site (the vendor of consumable elements of the device 30, for example, the manufacturer of the device 30). The client PC 20 and the device 30 are installed at a user site (at the user of the device 30, for example, at an office). The order support server 10 and the client PC 20 are connected to each other via a wide area network 40 such as the Internet. The client PC 20 and the device 30 are connected to each other via a network 50 (either wired or wireless) such as a LAN (Local Area Network) provided at the user site.

The device 30 is an image forming apparatus such as a typical printer or a multifunction peripheral that forms images by consuming toner or ink. In the present embodiment, the device 30 supports the MIB (Management Information Base). The device 30 can respond to a request for MIB information, which request is received via the network 40 based on the SNMP (Simple Network Management Protocol). Furthermore, in the present embodiment, the device 30 can detect information indicating the status of consumable elements (status information). The status information can be qualitative (normal/near-end/end) or quantitative (100%, 90%, . . . , 10%, 0%).

The client PC 20 is a general-purpose computer, and a monitor program 21 is installed therein. The monitor program 21 can be installed from a recording medium 502 such as a CD-ROM or downloaded via the network 40. As described below, in the present embodiment, the monitor program 21 is downloaded via the network 40.

Figure 2:
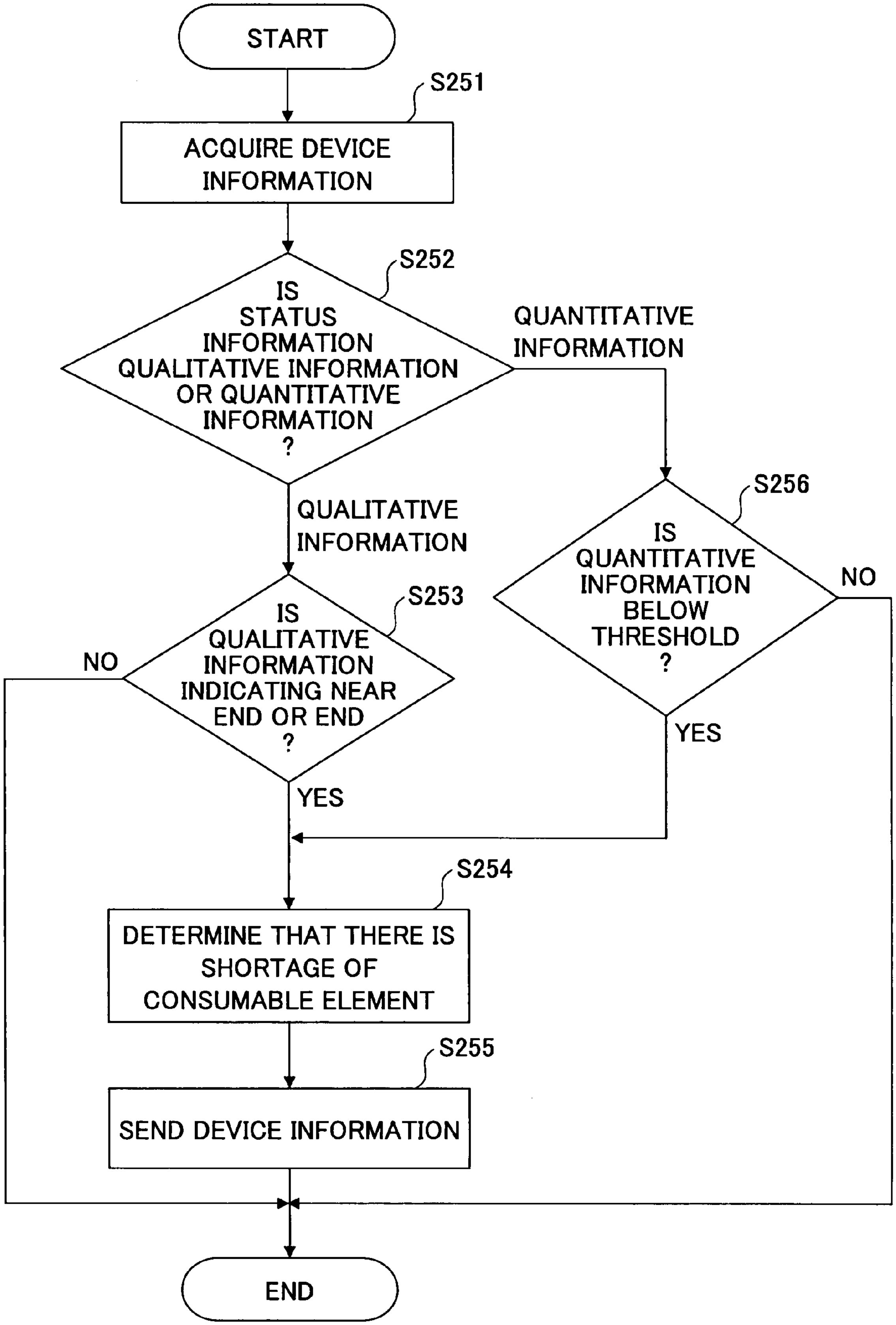
FIG. 2 is a flowchart of a process that a monitor program causes a client PC to perform.

The monitor program 21 is loaded into a memory in the client PC 20 and processed by a CPU to cause the client PC 20 to execute the following functions. FIG. 2 is a flowchart of a process that the monitor program 21 causes the client PC 20 to perform.

The client PC 20 periodically acquires device information (MIB information) from each device 30 based on the monitor program 21 (step S251). The device information includes information (status information) for determining the status of consumable elements used by the device 30, such as the toner status or a total counter value (total number of printed out sheets). The device information can include the status information of other consumable elements, such as a fixing unit, a toner eject bottle, a photoconductor, or a developer. If the status information of consumable elements included in the acquired device information is qualitative (i.e., normal/near-end/end) ("qualitative information" in step S252), and the information indicates near-end or end (hereinafter collectively referred to as "end") (Yes in step S253), it is determined that there is a shortage (lack) in the consumable element (step S254), and the device information of the device 30 is sent to the order support server 10 (step S255). On the other hand, if the status information of consumable elements included in the acquired device information is quantitative (i.e., 100%, 90%, . . . , 10%, 0%) ("quantitative information" in step S252), it is determined whether the information indicates a value below a predetermined threshold (less than or equal to 30%) (step S256). If the value is below the predetermined threshold (Yes in step S256), it is determined that there is a shortage (lack) in the consumable element (step S254), and the device information of the device 30 is sent to the order support server 10 (step S255).

In the present embodiment, the client PC 20 detects whether there is a shortage (lack) in the consumable element; however, this detection can be performed by the order support server 10. In the latter case, the client PC 20 needs to send the device information of all of the devices 30 to the order support server 10. Thus, in terms of reducing the network load, it is preferable to send, to the order support server 10, the device information of only the device 30 that is detected by the client PC 20 as lacking in a consumable element.

In the client PC 20, a mailer for sending/receiving e-mails and a Web browser for browsing a Web page are also installed.

The order support server 10 is a general-purpose computer that has a function of a Web server and has an order support program 11 installed therein. The order support program 11 can be installed from a recording medium 501 such as a CD-ROM or downloaded via the network 40.

The order support program 11 is loaded in a memory of the order support server 10 and processed by a CPU to cause the order support server 10 to execute the following functions. That is, based on the order support program 11, an e-mail creating unit of the order support server 10 creates an e-mail to prompt replenishment (or replacement) of a consumable element (hereinafter, "supply") determined as lacking based on the device information received from the client PC 20. The e-mail is sent to an e-mail address of a user that is registered beforehand. The e-mail message contains the URL of a Web page (hereinafter, "supply order page") for ordering the lacking supply. In response to an HTTP request that is transmitted as the user clicks the URL, the order support server 10 returns the supply order page. Then, the order support server 10 receives an order request for the supply, which request is made with the supply order page. In response to the supply order request, the order support server 10 sends an order instruction for the supply to a not shown supply order management system.

Figure 3:
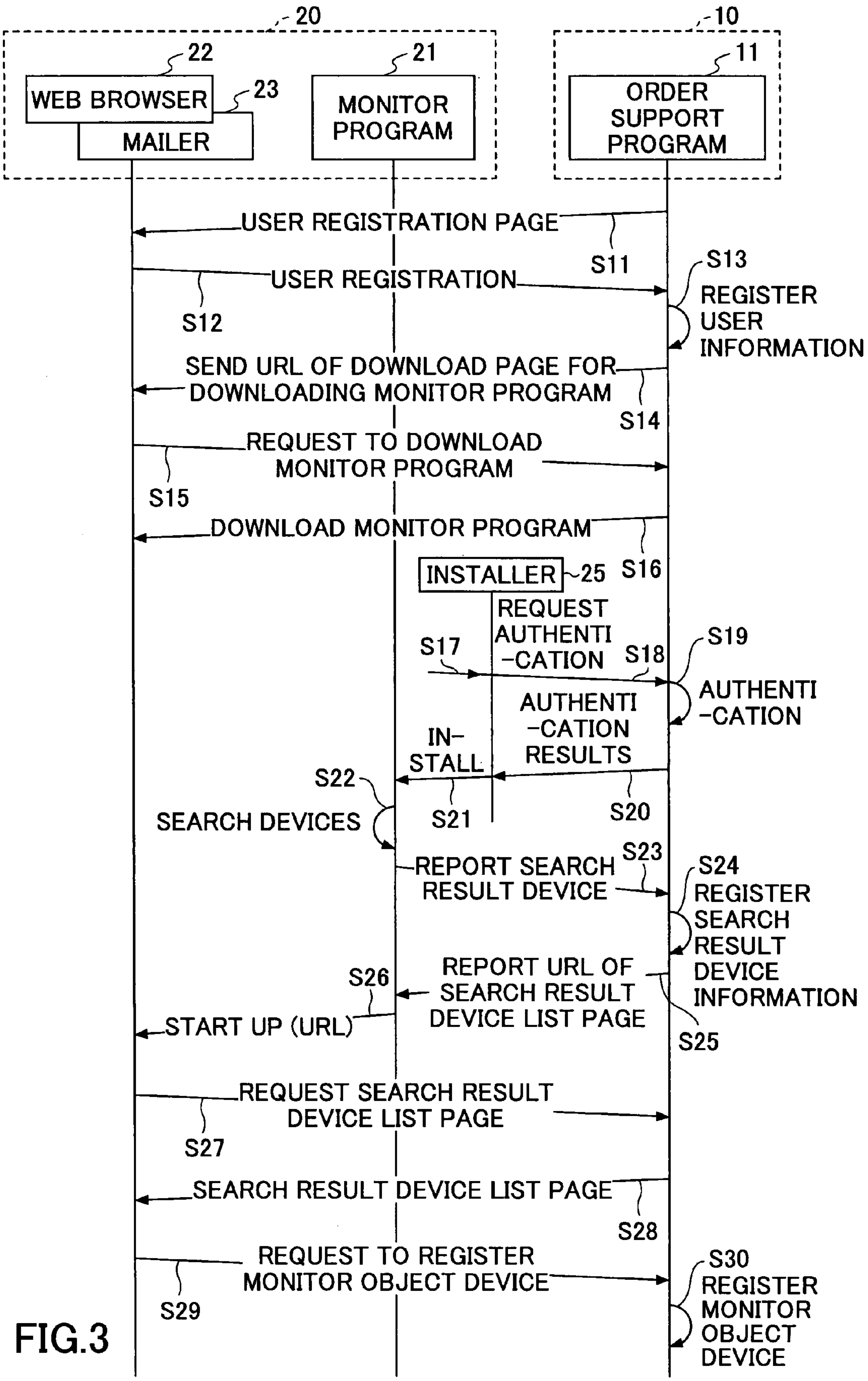
FIG. 3 is a sequence diagram for describing the process of user registration performed by the order support system.

A process performed by the order support system 1 shown in FIG. 1 is described below. A user that purchased the device 30 from a vendor concludes a registration contract for being registered in the order support system 1 with the vendor. The user that has concluded the registration contract first performs user registration as illustrated in FIG. 3. As will become apparent in the description below, the user can expect to reduce costs required for the operation of replenishing (replacing) the supply by using the order support system 1. Such an expectation becomes an incentive for the user to conclude the registration contract.

FIG. 3 is a sequence diagram for describing the process of user registration performed by the order support system 1. As shown in FIG. 3, a Web browser 22 is a general-purpose Web browser installed in the client PC 20. A mailer 23 is a general-purpose mailer installed in the client PC 20.

The user obtains an ID (hereinafter, "access ID") for accessing the order support server 10 to conclude the registration contract and the URL of the order support server 10 from a vendor, and inputs the URL in the Web browser 22. As the URL is input, a request to input the access ID is displayed. If a legitimate access ID is input, a Web page (hereinafter, "user registration page") for performing user registration is sent from the order support server 10 to the Web browser 22 (step S11). Upon receiving the user registration page, the Web browser 22 displays the user registration page.

Figure 4:
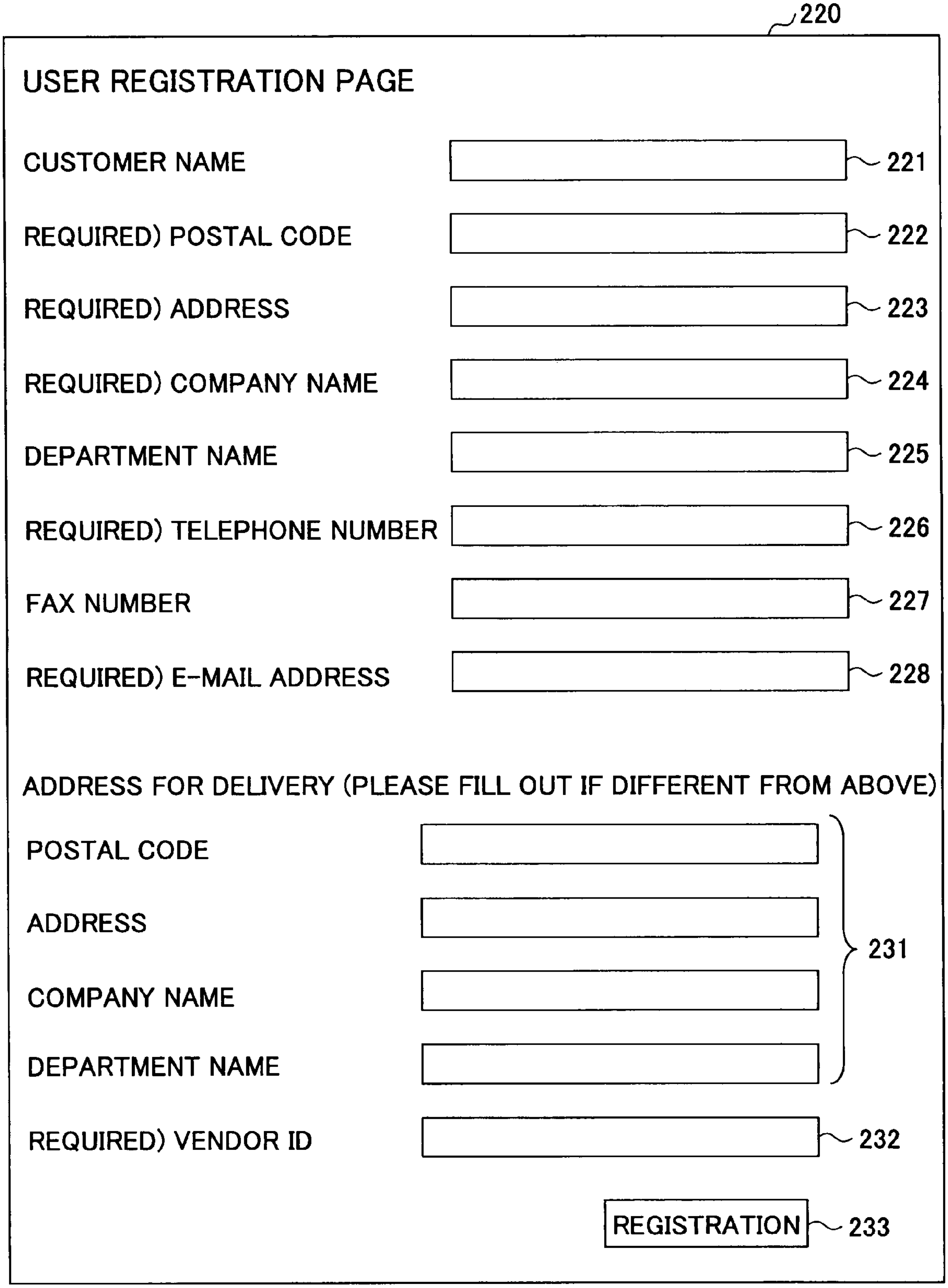
FIG. 4 is an example of a user registration page.

FIG. 4 is an example of the user registration page. In the following description for FIG. 4, numbers inside ( ) correspond to reference numerals in FIG. 4. As shown in FIG. 4, in a user registration page 220, it is possible to input basic information such as the name of the user (221), a postal code (222), an address (223), a company name (224), a department name (225), a telephone number (226), a fax number (227), and an e-mail address (228), and other information such as a postal code, an address, a company name, and a department name of the address (231) for delivering supplies when orders for supplies are made, and a vendor ID (232). The vendor ID is the ID of the vendor with which the user concludes a registration contract, and is notified by the vendor when the registration contract is concluded.

The user inputs necessary information in the user registration page 220 and clicks a registration button 233. Then, the Web browser 22 sends an HTTP request to the order support server 10, requesting to perform user registration (step S12). The HTTP request includes information input to the user registration page 220 (hereinafter referred to "user information", including the vendor ID).

When the HTTP request is received, the order support program 11 of the order support server 10 registers the user information included in the HTTP request to a predetermined database (hereinafter, "user database") (step S13). When registering the user information, the order support program 11 determines whether the order support server 10 includes an entry of the vendor ID included in the user information. If there is such an entry, the order support program 11 generates or acquires a number for a user ID and a password for the user. The user ID and the password are also included in the user information and registered in the user database.

Subsequently, the order support program 11 sends a URL of a Web page (hereinafter, "download page") for downloading the monitor program 21 and an e-mail (hereinafter, "install information report e-mail") containing the generated user ID and password in the body thereof, to the e-mail address of the user (step S14). The order support program 11 also sends, to the Web browser 22, a Web page for displaying a message reporting that the install information report e-mail has been sent, by including the Web page in an HTTP response made to the HTTP request received in step S12. The user can acknowledge receipt of the install information report e-mail by viewing the Web page. By viewing the install information report e-mail with the mailer 23, the user can confirm the URL of the download page and the user ID and password given to the user.

The URL of the download page does not necessarily have to be reported with an e-mail. For example, in step S14, it is possible to return the download page per se, instead of returning the Web page displaying the message that the install information report e-mail has been sent. However, if the download page is returned at the timing of step S14, the user has to continue the install operation. The method of using the install information report e-mail is more convenient for the user in that the user can perform the install operation whenever convenient, once the mail is received. The information can also be sent by fax or post.

When the user clicks the URL of the download page written in the install information report e-mail, the mailer 23 causes the Web browser 22 to start up by taking the URL as an argument. When the Web browser 22 starts up, the Web browser 22 displays the download page based on the URL. On the download page, the user clicks a URL of a download destination. Then, the Web browser 22 sends a download request for downloading the monitor program 21 to the order support server 10 (step S15). In response to the download request, the order support program 11 transfers an install package of the monitor program 21, which package is saved in the order support server 10, to the client PC 20 (step S16).

The user starts up an installer 25 included in the downloaded install package (step S17). When the installer 25 starts up, it displays a request to prompt the user to input the user ID and password reported in the install information report e-mail. When the user inputs the user ID and password, the installer 25 sends the input user ID and password to the order support server 10, and requests user authentication (step S18). The order support program 11 cross-checks the user ID and password received from the installer 25 with the user ID and password registered in the user database to authenticate the user (step S19). The order support program 11 returns the authentication results to the monitor program 21 (step S20). When the user is successfully authenticated, the installer 25 installs the monitor program 21 (step S21); when the user is not successfully authenticated, the installer 25 does not install the monitor program 21.

The monitor program 21 is installed only when the user is authenticated. Accordingly, it is possible to prevent a user that had fraudulently obtained the install package from installing the monitor program 21. The monitor program 21 performs communications with the order support program 11 via the network 40. Thus, in order to prevent fraudulent users from using the monitor program 21 and protect the order support server 10 from being attacked via the network 40, it is effective to perform user authentication before installing the monitor program 21. The installing process performed by the installer 25 is described below in detail.

If the monitor program 21 is normally installed, the monitor program 21 starts operating in the client PC 20. First, the monitor program 21 searches the devices 30 connected to the network 50 (step S22), and sends all search result information of the devices 30 (e.g., a serial number of the device, a MAC address, a machine name, a vendor name (name of manufacturer of device); hereinafter, "search result device information") to the order support server 10 (step S23). The operations of searching the devices 30 and acquiring the search result device information via the network 50 can be performed by known techniques.

The order support program 11 registers the received search result device information into a predetermined database (hereinafter, "device database") (step S24), and sends a URL of a Web page (hereinafter, "search result device list page") displaying a list of the search result device information to the monitor program 21 (step S25). The monitor program 21 starts up the Web browser 22 by taking the received URL as an argument (step S26). When the Web browser 22 starts up, the Web browser 22 sends an HTTP request requesting the search result device list page based on the URL specified as the argument to the order support server 10 (step S27). When the HTTP request is received, the order support program 11 generates a search result device list page based on the search result device information registered in step S24, and returns the search result device list page to the Web browser 22 (step S28).

FIG. 5 is an example of a displayed search result device list page. In the following description for FIG. 5, numbers inside ( ) correspond to reference numerals in FIG. 5. As shown in FIG. 5, a search result device list page 240 displays, for each device 30 found as a result of the search, a serial number, a MAC address, an IP address, a model name, and a vendor name. Furthermore, the search result device list page 240 includes, for each device 30, a column (241) for inputting remarks and a check button (242) for selecting whether to specify the corresponding device 30 as a monitor object to be monitored by the monitor program 21. The user can input a remark and select whether to monitor the device 30 for each device 30 in the search result device list page 240. In the present embodiment, when the check button (242) is checked, it is determined that the corresponding device 30 is selected as a monitor object. In the remarks column (241), the user can arbitrarily input any kind of information. For example, information that would facilitate the operation of replacing consumable elements, such as the location of the device 30, can be input.

In the search result device list page 240, the user inputs a remark on each device 30, selects whether to monitor each device 30, and clicks a send button 243. Then, the Web browser 22 sends an HTTP request to the order support server 10, requesting to register the remarks input and the selections made regarding the necessity of being monitored regarding the devices 30 (step S29). The order support program 11 additionally registers the remarks input and the selections made regarding the necessity of being monitored for the devices 30 based on the received HTTP request (step S30).

The process of user registration is completed. Other than when the monitor program 21 is installed, the user can add other devices 30 as monitor objects by selecting menu items. Similarly, the monitor program 21 registers search result device information and causes the client PC 20 to display a search result device list page.

Figure 6:
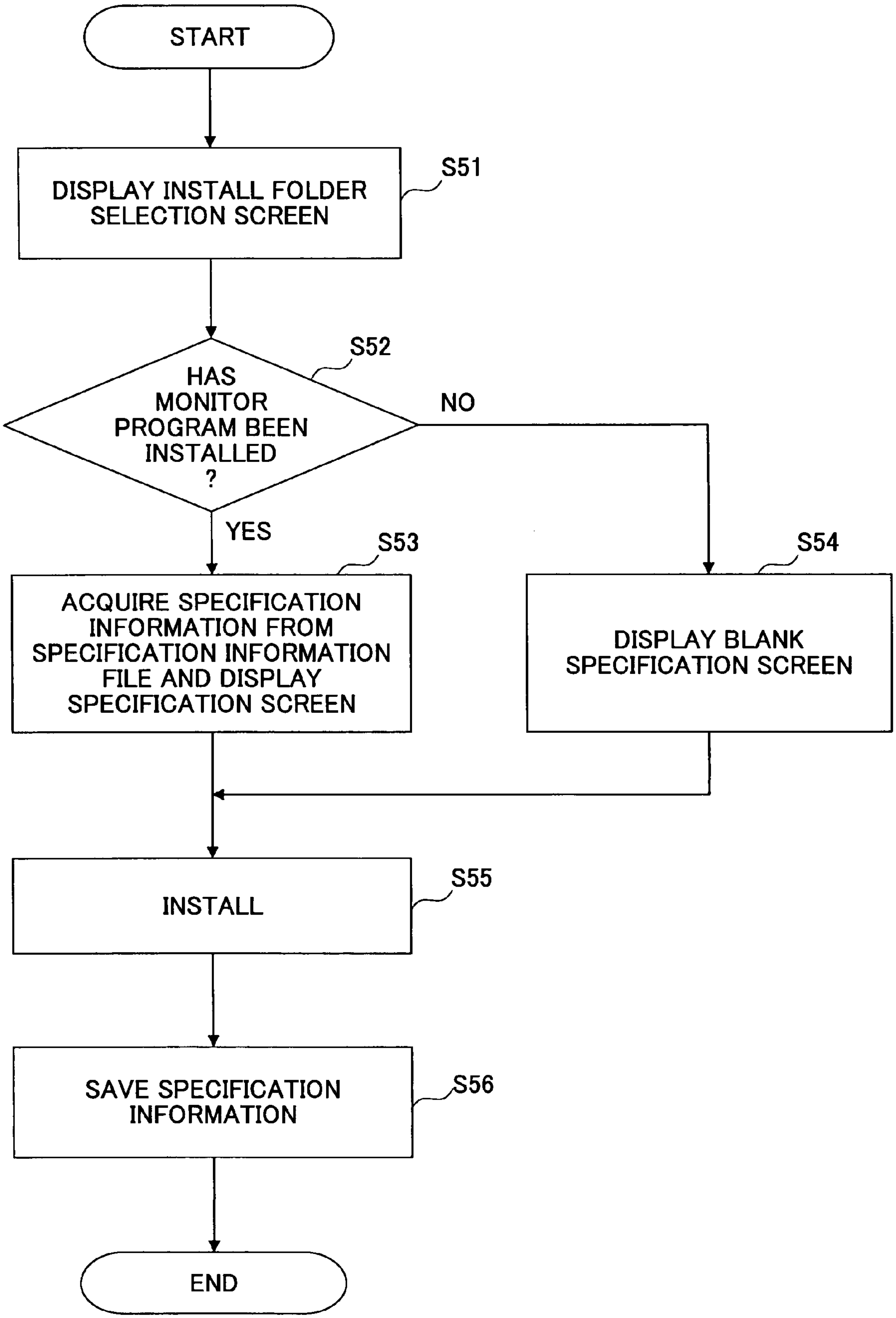
FIG. 6 is a flowchart of a process of installing the monitor program.

Next, details of the process of installing the monitor program 21 performed by the installer 25 are described. FIG. 6 is a flowchart of a process of installing the monitor program 21.

When a user starts up the installer 25, the installer 25 causes the client PC 20 to display a screen for selecting an install destination (folder or directory) (hereinafter, "install folder selection screen") (step S51). In the install folder selection screen, a default install folder can be displayed for the convenience of the user. When the user selects an install folder, the installer 25 determines whether the monitor program 21 has been installed in the client PC 20 in the past (step S52). If the monitor program 21 has been installed in the past, it means that the monitor program 21 is presently installed or the monitor program 21 has been installed and then uninstalled in the past. This determination is made based on whether there is information that is recorded in the client PC 20 when installing the monitor program 21. In the present embodiment, the determination is made based on whether there is a specification information file. The specification information file holds information that is specified when installing the monitor program 21 (hereinafter, "install specification information"), which file is generated in step S56 described below. Accordingly, at this point, it is confirmed whether there is a specification information file, which would have been generated in an install folder if the monitor program 21 has previously been installed.

FIG. 7 is an example of the structure of the install specification information saved in the specification information file. As shown in FIG. 7, the install specification information held in the specification information file includes a URL of the order support server 10, a user ID, a password, an IP address and a port number of a proxy server at the user site, and a user name and a password acting as authentication information for the proxy server.

When it is determined that the monitor program 21 has been installed (when there is a specification information file), the installer 25 acquires install specification information from the specification information file and causes the client PC 20 to display a specification screen containing the specified install specification information (step S53). The specification screen is displayed for making a user input install specification information.

FIG. 8 is an example of the specification screen displayed with the install specification information specified.

Referring to FIG. 8, a specification screen 301 is displayed first. The specification screen 301 requests the user to input the URL of the order support server 10, a user ID, and a password. The user ID and the password are reported to the user by the install information report e-mail. A specification screen 302 is displayed after a Next button 3011 shown in the specification screen 301 is pressed. The specification screen 302 requests the user to input the IP address and the port number of the proxy server at the user site and a user name and a password acting as authentication information for the proxy server.

However, if the monitor program 21 has previously been installed, the specification screens 301 and 302 shown in FIG.

8 will contain the install specification information input at that time. Therefore, unless there are any changes to be made in the install specification information, the user is not required to input the install specification information again. On the other hand, when it is determined that the monitor program 21 has never been installed (when there is no specification information file), the installer 25 displays the specification screens 301 and 302 with blank input fields (step 54). In this case, the user needs to input each information item.

When the user presses a Complete button 3021 in the specification screen 302, the installer 25 installs the monitor program 21 (step S55). Before the installation, the installer 25 sends the user ID and the password input to the specification screen 301 to the order support program 11. Only when the user ID and the password are authenticated, the installer 25 installs the monitor program 21. This point is the same as that described with reference to steps S18-S20 in FIG. 3.

When the monitor program 21 is successfully installed, the installer 25 generates a specification information file in the install folder, and saves the install specification information in the specification information file in the format shown in FIG. 7 (step S56). However, if the monitor program 21 is installed based on the install specification information previously input, this step is unnecessary.

Figure 9:
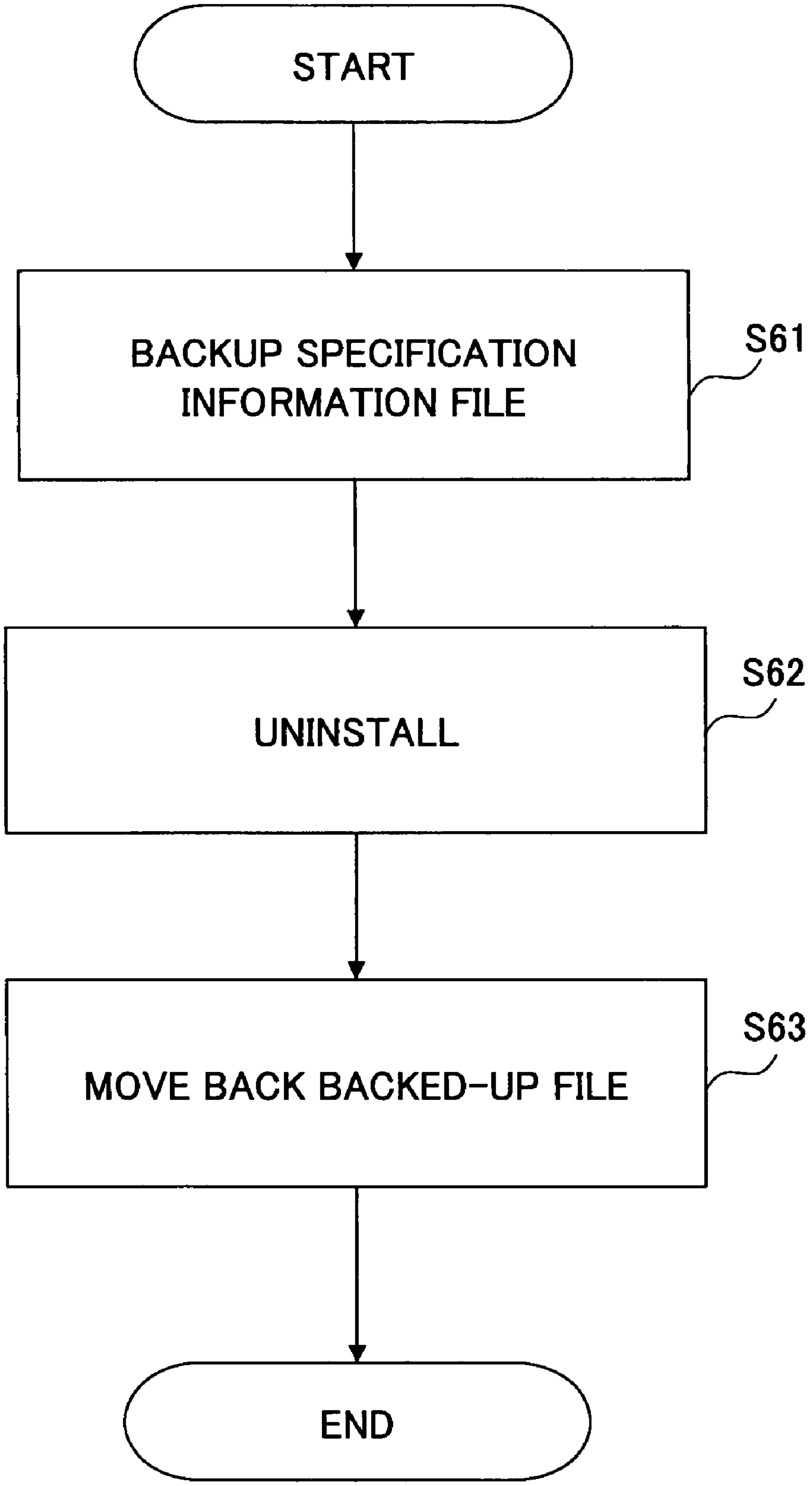
FIG. 9 is a flowchart for describing a process for uninstalling the monitor program.

The monitor program 21 is uninstalled by an uninstaller included in the install package. FIG. 9 is a flowchart for describing a process for uninstalling the monitor program 21.

When an instruction to uninstall the monitor program 21 is received from a user, the uninstaller creates a copy of the specification information file and evacuates (saves) the copy in a folder other than the install folder (step S61). The uninstaller uninstalls the monitor program 21, and deletes files in the install folder (step S62). The uninstaller moves the evacuated (saved) specification information file back to the install folder (step S63).

As described above, even after the monitor program 21 is uninstalled, the specification information file remains in the install folder. Accordingly, when starting to install the monitor program 21 in step S52, it can be determined that the monitor program 21 has been installed in the past if the specification information file exits. It is also possible to let the user select whether to save a backup of the specification information file.

Figure 10:
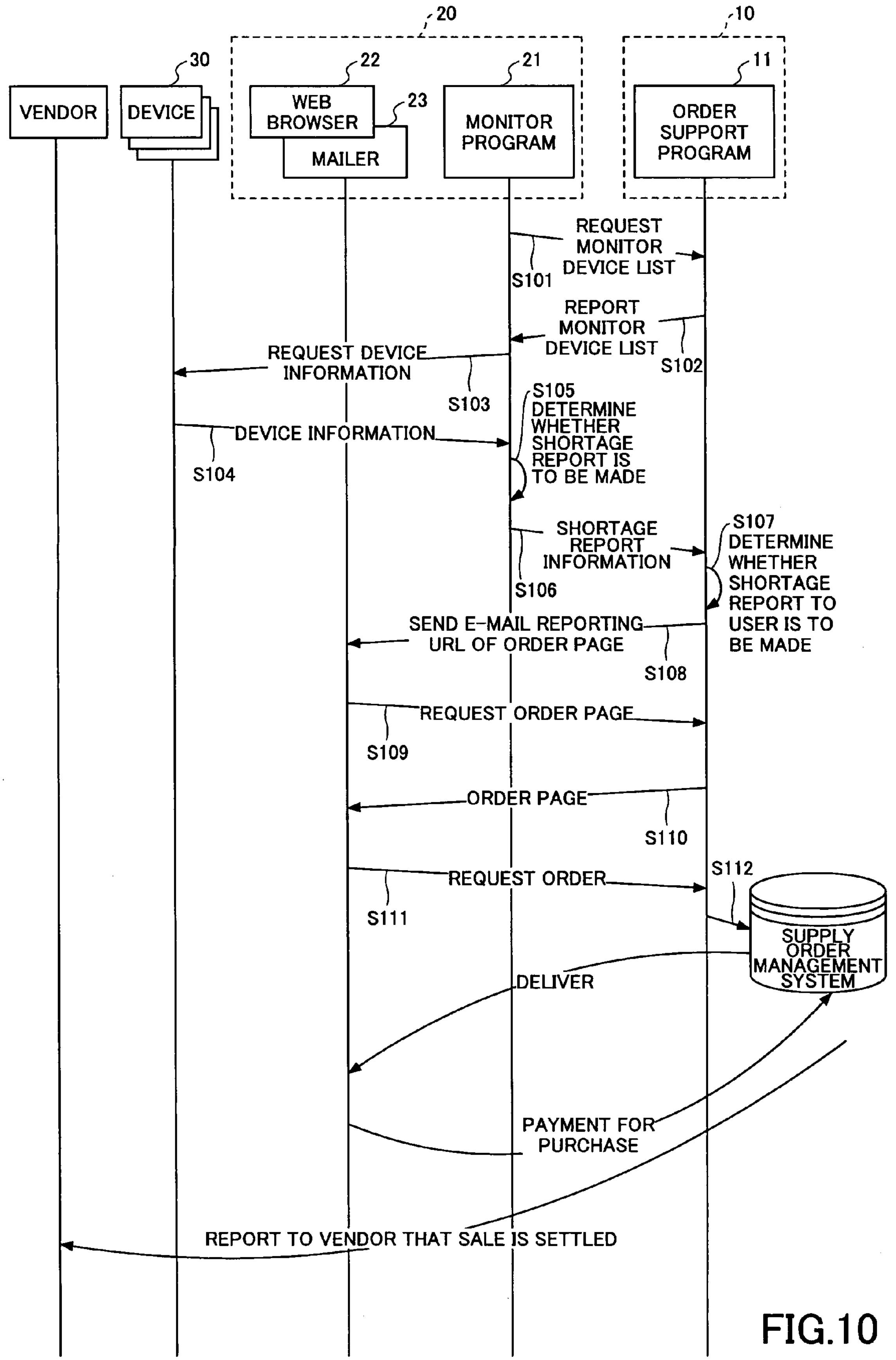
FIG. 10 is a sequence diagram for describing the process of monitoring devices performed by the order support system.

Next, a description is given of a process performed by the order support system 1 when the monitor program 21 installed in the client PC 20 periodically monitors the status of the devices 30. FIG. 10 is a sequence diagram for describing the process of monitoring the devices 30 performed by the order support system 1.

When it is time to monitor the status of the devices 30, the monitor program 21 requests a list of devices 30 that are monitor objects (hereinafter, "monitor devices") from the order support server 10 (step S101). The order support program 11 lists the monitor devices based on the necessity of being monitored as registered in the device database and returns the list (monitor device list) to the monitor program 21 (step S102). Other than the predetermined periodic time points for monitoring the devices 30, the monitor program 21 can monitor the devices 30 at any time point according to, for example, a menu item selected by the user.

The monitor program 21 receives the monitor device list, and requests the MIB information acting as device information based on SNMP from the devices 30 included in the monitor device list (step S103). The MIB information to be requested includes at least status information of toner and may also include status information of other supplies. Each of the devices 30 returns the requested MIB information to the monitor program 21 (step S104).

In implementing the present invention, the device information is not limited to MIB information and the protocol for requesting the device information is not limited to SNMP. However, by using standardized techniques, it is possible to acquire device information by performing a common procedure for multiple devices 30, even if the devices 30 are from different vendors. Therefore, it is preferable to use standardized techniques such as MIB and SNMP.

When device information is acquired (polled) from all monitor devices, the monitor program 21 determines whether a shortage report is to be made based on the device information (step S105). That is, as described with reference to FIG. 2, if the status information of consumable elements included in the acquired device information is qualitative (i.e., normal/near-end/end), and the information indicates end, it is determined that there is a shortage of the consumable element, and the device information of the corresponding device 30 is sent to the order support server 10 (step S106). If the status information of consumable elements included in the acquired device information is quantitative (i.e., 100%, 90%, 10%, 0%), it is determined whether the information indicates a value below a predetermined threshold (less than or equal to 30%). If the value is below the predetermined threshold, it is determined that there is a shortage of the consumable element, and the device information of the corresponding device 30 is sent to the order support server 10 (step S106). The shortage of the supply may also mean that the function has been degraded due to continuous usage. The information to be reported is hereinafter referred to as "shortage report information".

FIG. 11 is an example of the structure of shortage report information. As shown in FIG. 11, the shortage report information includes header information and device information.

The header information includes the date and time, a user ID, and a password. The date and time are the date and time of transferring the device information. The user ID and password are input when the monitor program 21 is installed, which are the saved user ID and password. Thus, the header information is not acquired from the device 30.

The device information is as described above. Specifically, the device information is acquired as MIB information from the device 30, including a vendor name, a model name (information for specifying the device 30), a serial number, a MAC address, an IP address, a toner ID (information for specifying a toner bottle: in the case of a color device, a toner ID is given for each color; in the case of a monochrome device, only one ID is given), a toner name, a toner status, a toner level, a toner name (character string), a toner name (code), and a total counter value, of the device 30. This information is defined by public MIB (standard MIB), and can be acquired from any device 30 regardless of the vendor.

The toner status indicates the status of the toner. The total counter value indicates the total number or printed out sheets. The monitor program 21 detects "toner end" (toner has finished) based on the toner status. The monitor program 21 determines the extent to which a photoconductor, a fixing unit, or a developer is consumed based on the total counter value. However, the toner status indicated by the standard MIB cannot specify the color of the toner that has been expended (finished).

Accordingly, the device information according to an embodiment of the present invention also includes a monochrome counter value, a color counter value, a cyan counter value, a magenta counter value, a black counter value, and a red counter value. These are uniquely defined by a vendor as private MIB (extended MIB).

For example, in an embodiment of the present invention, it is assumed that only the devices 30 made by a manufacturer A provide the extended MIB. Therefore, device information of the devices 30 made by manufacturer A includes these values; however, these values are blank in device information of the devices 30 made by manufactures other than manufacturer A.

The monochrome counter value is the number of sheets printed out by monochrome printing. The color counter value is the number of sheets printed out by color printing. The cyan counter value, the magenta counter value, the black counter value, and the red counter value are the numbers of sheets printed out by using toners of the respective colors. Therefore, if the device 30 is made by manufacturer A, it is possible to detect the end of toner by each color.

In an embodiment of the present invention, the information shown in FIG. 11 is reported as the shortage report information; however, the present invention is not limited thereto. The information to be reported can be appropriately determined according to need.

For each device 30 detected as having a shortage of a supply, the shortage report information shown in FIG. 11 is sent to the order support program 11.

Upon receiving the shortage report information, the order support program 11 identifies the supply of which a shortage is indicated by the shortage report information, and determines whether to report the shortage to the user (step S107). Details of the determination process are described below. This process is performed to prevent the order support program 11 from redundantly sending reports of the same shortage to the user, as there may be cases where shortage report information is received redundantly.

When it is determined that the shortage report information is not redundant, the order support program 11 generates a Web page (hereinafter, "order page") for ordering the lacking supply, creates an e-mail (hereinafter, "shortage report e-mail") for reporting that there is a shortage of the corresponding supply, and sends the e-mail to the user's e-mail address (step S108). The shortage report e-mail contains the URL of the order page. Each shortage report e-mail is given an ID (hereinafter, "mail ID"). The mail ID is saved together with information for identifying the device 30 such as the serial number of the device 30 that is the subject of the shortage report e-mail, information for identifying the user such as a user ID or an e-mail address, and the sent date and time, as the transmission history of the shortage report e-mail.

Figure 12:
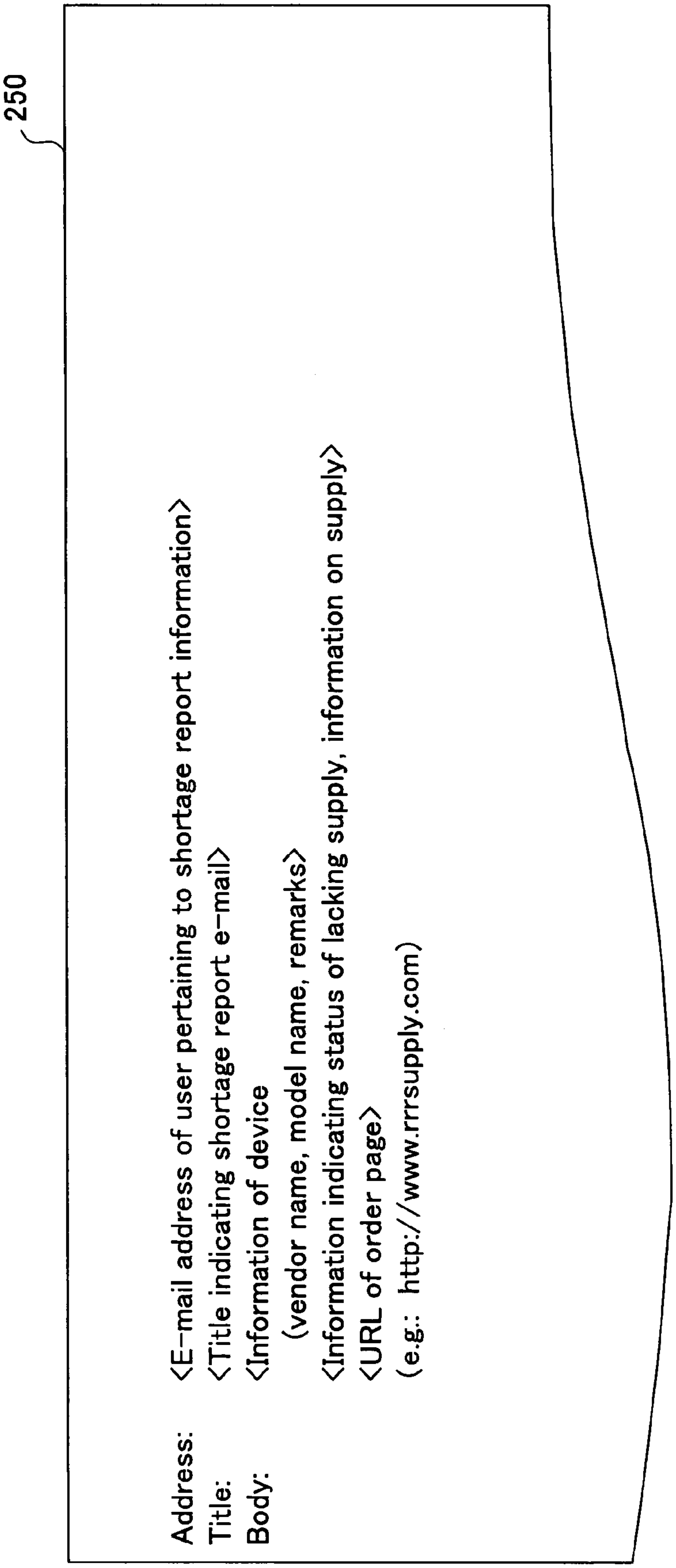
FIG. 12 illustrates an example of the shortage report e-mail.

FIG. 12 illustrates an example of the shortage report e-mail. In a shortage report e-mail 250 shown in FIG. 12, character strings in < > do not indicate specific values but describe the contents of the information to be input to the corresponding position.

As shown in FIG. 12, an e-mail address of a user pertaining to the shortage report information is input as the destination of the shortage report e-mail 250. The e-mail address of the user can be specified by searching the user database, using the user ID and the password included in the shortage report information as search keys. At the time of user registration, a user ID and a password are registered together with an e-mail address in the user database.

The title of the shortage report e-mail 250 indicates that it is a shortage report e-mail. The body of the shortage report e-mail 250 contains information regarding the device 30 pertaining to the shortage report information, information on the lacking supply, the URL of the order page, etc.

The information regarding the device 30 includes a vendor name and a model name of the device 30 and remarks. This information can be acquired from the device database by using a serial number, a MAC address, or an IP address included in the shortage report information as a search key. If the lacking supply is toner, the information on the lacking supply includes information such as a toner status, a toner ID, and a toner name included in the shortage report information.

If shortages in plural supplies occur at the same time in a single device 30, a single shortage report e-mail 250 with information indicating the shortages of the plural supplies is created, and the shortages of the plural supplies are reported.

A user views the shortage report e-mail 250 with the mailer 23 in the client PC 20, and can acknowledge the shortage of the supply without executing a printing job. Furthermore, by inputting the location where the device 30 is installed as a remark, the location where the device 30 is installed can be easily identified based on this information.

When the user clicks the URL of the order page included in the shortage report e-mail 250, the mailer 23 causes the Web browser 22 to start up by taking the URL as an argument. When the Web browser 22 starts up, the Web browser 22 sends an HTTP request requesting the order page based on the URL specified as the argument to the order support server 10 (step S109). When the HTTP request is received, the order support program 11 returns the order page to the Web browser 22 (step S110). The Web browser 22 displays the received order page.

FIG. 13 is an example of the order page. As shown in FIG. 13, an order page 260 includes an area 261 displaying information regarding the device 30 with a lacking supply (manufacturer (vendor) name, model name, serial number, remarks (location)). An area 261A displays the name of the lacking supply. An area 262 displays a list of various supplies corresponding to the device 30, so that orders can be placed for the various supplies. Specifically, for each supply, a product name is displayed, and the quantity to be purchased can be input. As indicated by reference numeral 2621, the quantity necessary for the lacking supply is already input. Each product name provides a link to a Web page displaying descriptions of the corresponding product. An area 263 displays the purchase history of the corresponding user. Accordingly, redundant purchases can be prevented from being made by the user.

The purchase history is registered in the user database for each user. That is, every time a product is ordered via the order page 260, information on the ordered product is additionally registered in the user database.

The order page 260 shown in FIG. 13 is reporting that there is a shortage of the yellow toner. As described above, with the standard MIB, the specific color of the lacking toner cannot be identified. Thus, the order page 260 shown in FIG. 13 indicates the results determined based on information registered in the extended MIB. In this manner, a manufacturer participating in the order support system 1 can differentiate itself from another manufacture in terms of services provided with the order support system 1 by defining its own extended MIB. Specifically, assuming that toner end is detected (toner is finished) in the device 30 made by another manufacturer, the order page 260 does not report the specific color of the finished toner. It is possible to exclude supplies of the devices 30 made by other manufacturers from objects for placing orders using the order support system 1; however, in consideration of the user's convenience, supplies of the devices 30 made by other manufacturers can also be ordered in the present embodiment.

When the user clicks an order button 2622, the Web browser 22 sends an HTTP request to the order support server 10, requesting to order the product (step S111).

When the HTTP request is received, the order support program 11 records information for providing part of the profit to be made by the order request to a vendor associated with the user (step S112). Specifically, a database (hereinafter, "vendor database") for managing the sales of supplies sold with the order support system 1 is constructed, and the contents of the current order (e.g., total amount of orders) are recorded in the sales section of the vendor database. The vendor concludes a participation contract with the manufacturer to participate in the order support system 1. Accordingly, an entry to the vendor database is created. Furthermore, the vendor is given a vendor ID. The vendor is identified by the vendor ID in the order support system 1. In step S112, the user making the HTTP request can be identified by associating the user ID with a session ID of a session with the Web browser 22. Based on this association, a user ID can be identified from the session ID.

The order support program 11 sends an order instruction to the supply order management system. This instruction includes the address for delivering a supply, which address is registered in the user database. By sending the order instruction to the supply order management system, the ordered product is actually delivered to the user. When the user makes the payment, it is recorded in the vendor database that the sale of the current order has been settled. When the sale is settled, the vendor is given an allowance such as sales promotion fees in accordance with the sale.

Figure 14:
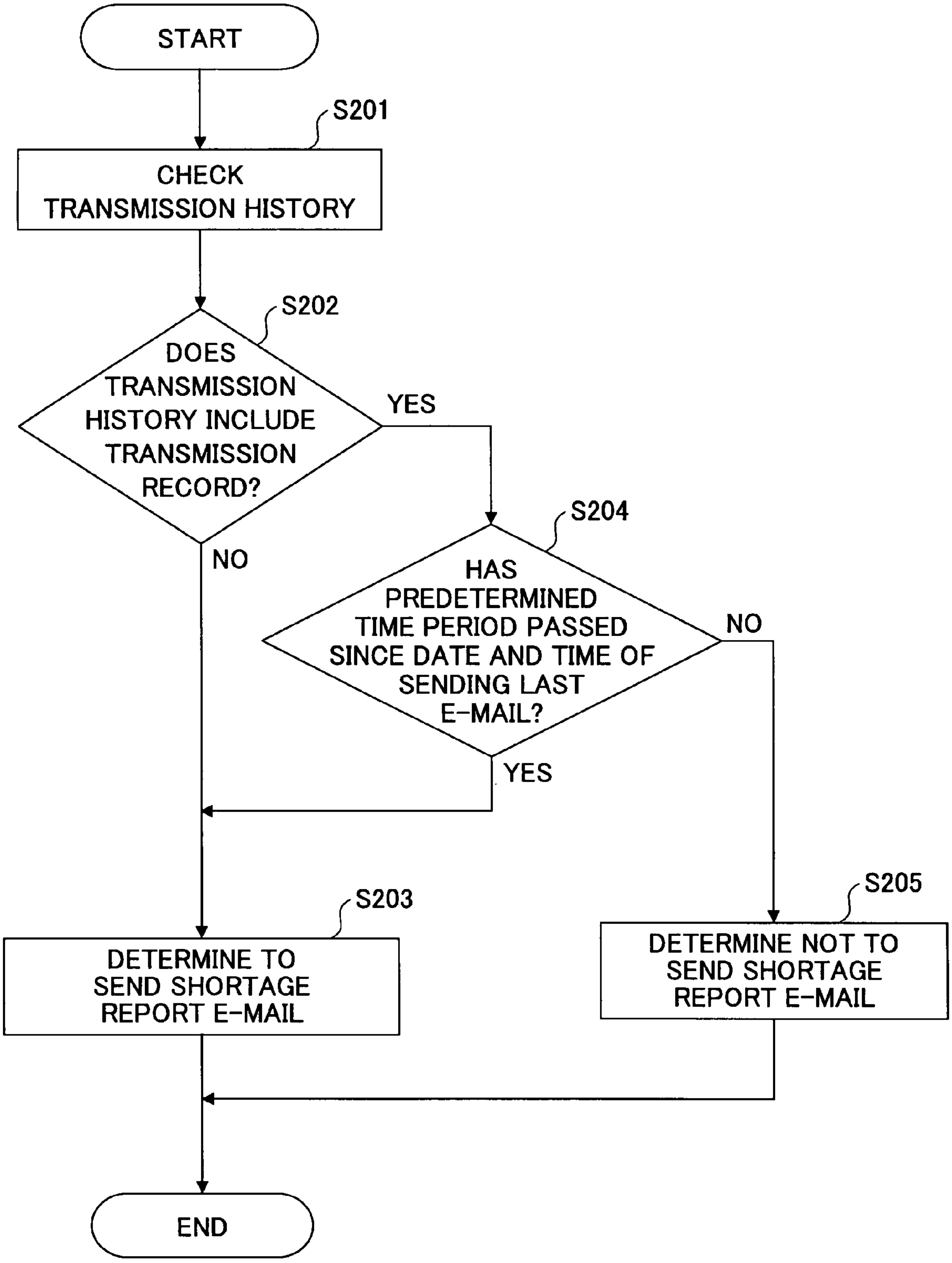
FIG. 14 is a flowchart of a process for determining whether to send the shortage report e-mail.

Next, details of a process performed in step S107 in FIG. 10 are described. FIG. 14 is a flowchart of a process for determining whether to send the shortage report e-mail. The significance of this process is described again below.

The monitor program 21 periodically requests device information from the devices 30 to determine whether there is a shortage of a supply based on the device information. When a shortage of a supply is detected as a result of the determination, the monitor program 21 sends shortage report information to the order support program 11. However, if the monitor program 21 detects a shortage of a supply but the corresponding supply is not replaced within a period during which the monitor program 21 is making requests for device information, the monitor program 21 may repeatedly detect the same shortage of supply of the same device 30. Furthermore, there may be cases where toner end is detected even when toner is still remaining in the toner bottle. In such a case, the user shakes the toner bottle (to loosen the toner) and then reattaches the toner bottle. However, after a while, toner end may be detected again for the same bottle. This means that the same shortage report would be redundantly sent to the user. If the user does not notice this redundancy, the user may place redundant orders. In order to prevent this from happening, the order support program 11 performs the following process.

First, based on the serial number of the device 30 included in the shortage report information received from the monitor program 21, the order support program 11 checks the date and time of the last (previous) shortage report e-mail sent regarding the corresponding device 30 by referring to the transmission history of shortage report e-mails (step S201).

When the transmission history does not include a transmission record that a shortage report e-mail has been sent to the corresponding device 30 (No in step S202), the order support program 11 determines to send a shortage report e-mail (step S203). If a shortage report e-mail has never been sent to the corresponding device 30, it means that a shortage report e-mail will not be sent redundantly.

If the transmission history includes a transmission record that a shortage report e-mail has been sent to the corresponding device 30 (Yes in step S202), the order support program 11 determines whether a predetermined period of time has passed since the date and time of sending the last shortage report e-mail (step S204). If a predetermined period has passed, the order support program 11 determines to send a shortage report e-mail (step S203); if a predetermined period has not passed, the order support program 11 determines not to send a shortage report e-mail to avoid redundancy (step S205).

FIG. 14 indicates an example of making the determination based on passage of time. However, it is also possible to record a total count as the transmission history, and determine not to send a shortage report mail if a difference indicated by the total count is below a predetermined threshold. Furthermore, it is also possible to delete the entire transmission history at regular time intervals, and refrain from sending a shortage report e-mail if the transmission history includes a transmission record that a shortage report e-mail has been sent to the same corresponding device 30.

As described above, the order support system 1 according to an embodiment of the present invention can provide convenience and benefits to the user (client), the vendor, and the manufacturer of the device 30.

Specifically, shortage of a supply of the device 30 is automatically detected, and a shortage report e-mail is automatically sent to a terminal of the user. The user can click the URL contained in the shortage report e-mail to display the order page 260 and easily order the lacking supply with the order page 260. The user is saved from the trouble of specifying the supply corresponding to the device 30 or going out to a mass merchandise outlet to purchase the supply, so that costs for procuring the supply can be reduced.

The vendor can gain part of the profits made with the supply, and can thus expand its profit-gaining sources.

The manufacturer can offer incentives to vendors to prioritize selling devices made by itself over devices made by other manufacturers. The manufacturer can also offer incentives to users to purchase devices made by the itself. Specifically, if a supply made by the manufacturer sold via the order support system 1 offers a higher commission rate compared to supplies made by other manufacturers, or if supplies made by other manufacturers offer a commission rate of zero, the vendor can gain higher profits by selling supplies made by the manufacturer. Furthermore, the user can expect to receive more detailed services by purchasing a device made by the manufacturer, such as being able to specify the color of the lacking toner.

The manufacture can roughly estimate the usage period of the devices 30 by accumulating device information of users. Accordingly, the manufacture can effectively contact the user to make new sales promotions such as prompting the user to replace the device 30 with a new one.

In the above embodiment, the user concludes a registration contract for being registered into the order support system 1 with the vendor. However, the other party with which the user concludes a registration contract is not limited to the vendor that provides the device. The manufacturer can give a vendor ID to be used in the order support system 1 to a dealer that does not sell devices. In such a case, the dealer can receive commissions from profits made by selling supplies via the order support system 1, regardless of whether the dealer sells devices.

Figure 15:
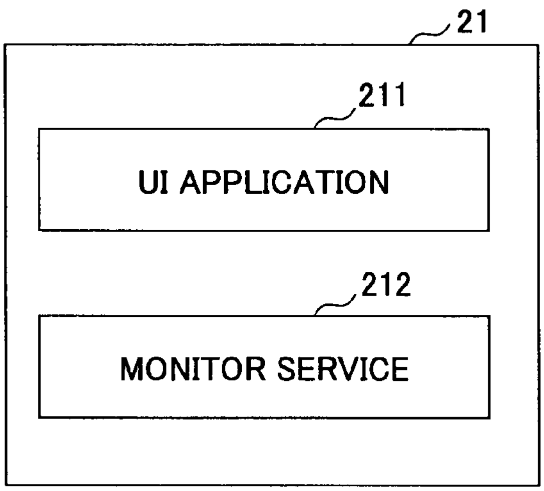
FIG. 15 illustrates the structure of a monitor program.

The monitor program 21 can include two or more programs. FIG. 15 illustrates the structure of such a monitor program 21. As shown in FIG. 15, the monitor program 21 includes a UI application 211 and a monitor service 212.

The monitor service 212 is a program that starts up as a daemon process and executes operations such as acquiring device information, determining whether there is a shortage of a consumable element based on the device information, and sending the device information relevant to a consumable element determined as lacking to the order support program 11. That is, the monitor service 212 realizes functions described above as functions of the monitor program 21.

The UI application 211 is an application that starts up as a separate process from the monitor service 212, and provides a GUI (Graphical User Interface) for functions of the monitor service 212. For example, the UI application 211 causes the client PC 20 to display a screen for specifying specification information (e.g., the period of acquiring device information) for the monitor service 212 or a screen for displaying device information acquired by the monitor service 212.

Figure 16:
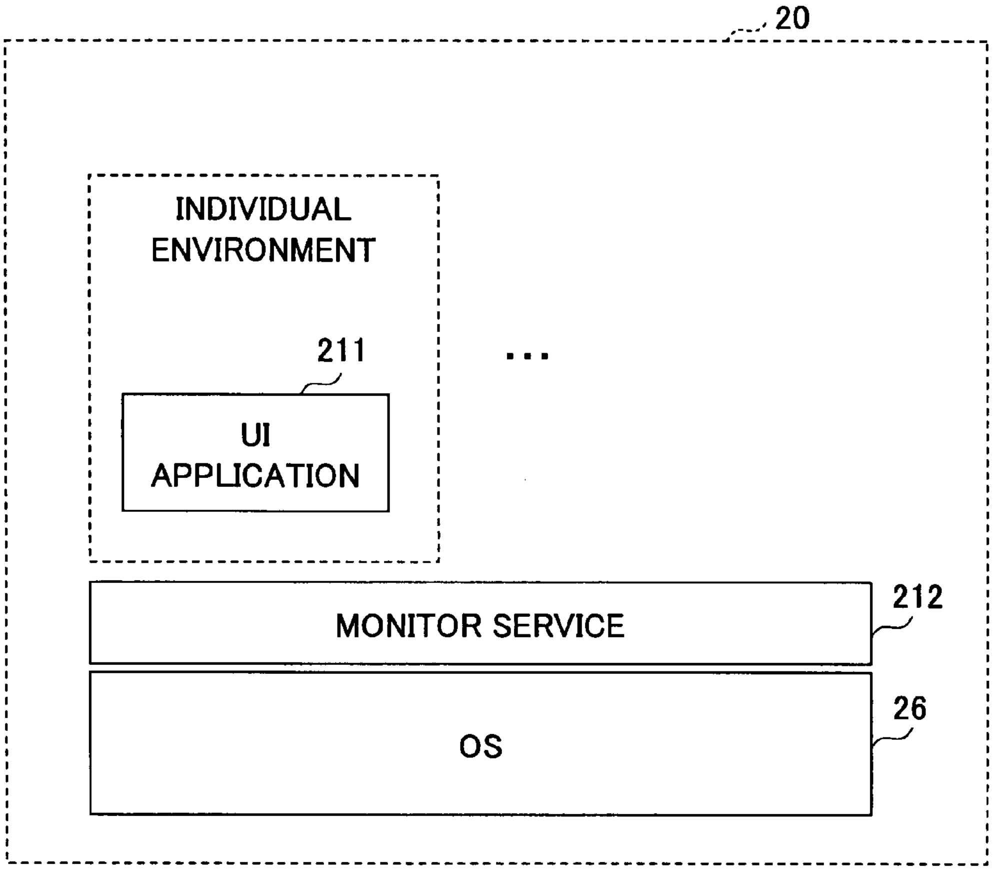
FIG. 16 illustrates the relationship between an individual environment including a UI application and a monitor service.

FIG. 16 illustrates the relationship between an individual environment including the UI application 211 and the monitor service 212. As shown in FIG. 16, the UI application 211 is started up for each individual environment (log on). The monitor service 212 is commonly used from plural individual environments. An individual environment is for the user to access software resources, and is established by logging on (or logging in).

Figure 17:
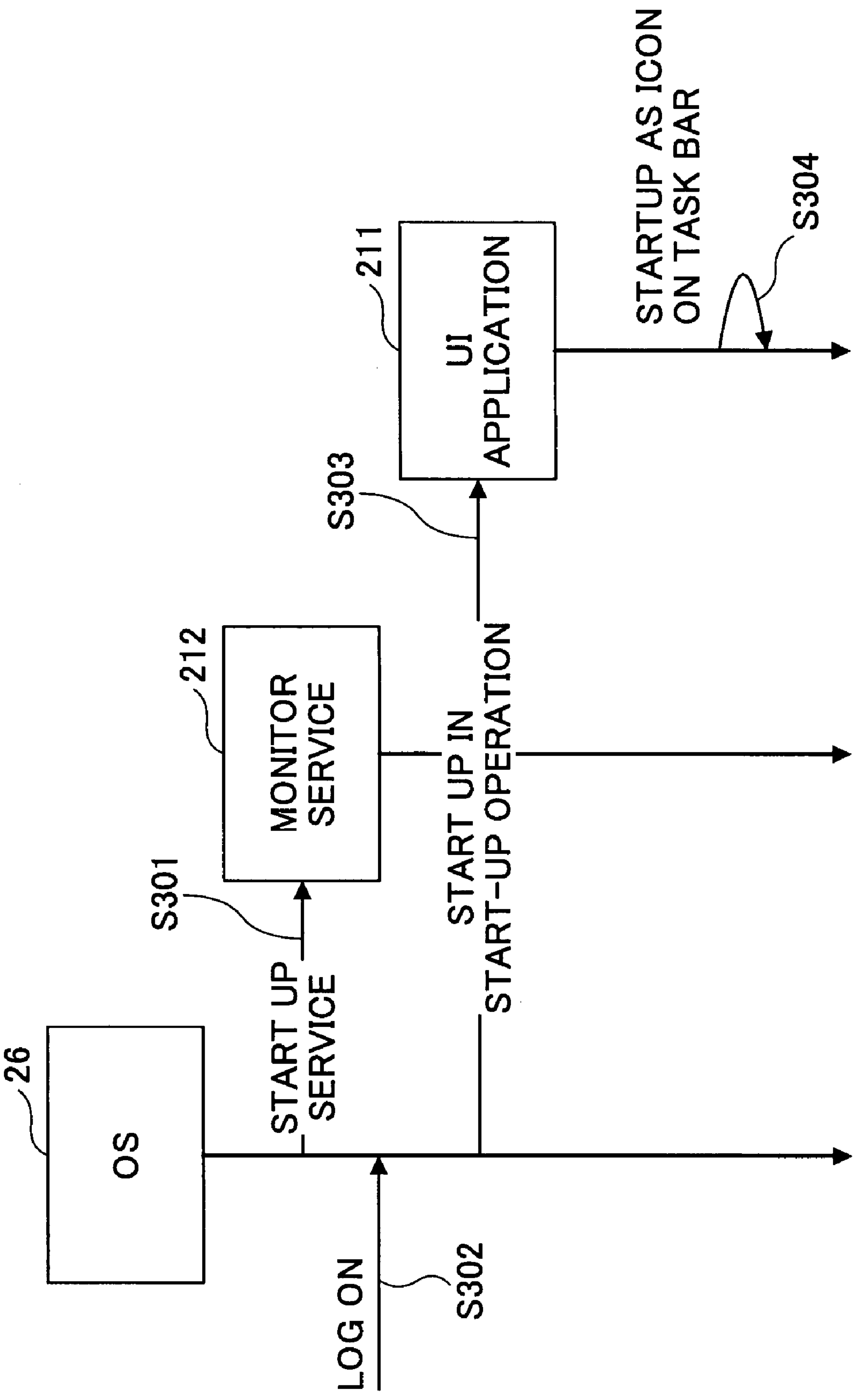
FIG. 17 is a sequence diagram for describing the process of starting up the monitor service when the client PC is booted.

The start-up process and the ending process for these two programs are described below. FIG. 17 is a sequence diagram for describing the process of starting up the monitor service 212 when the client PC 20 is booted.

When the client PC 20 is booted and an OS 26 such as Windows® starts up, the OS 26 starts up the monitor service 212 as a process (daemon process) during the start-up process of the OS 26 (step S301). When the user logs on (step S302), the OS 26 executes a start-up operation and starts up the UI application 211 as a process in the start-up operation (step S303). The UI application 211 displays its icon on a task bar in an initial status (step S304).

Figure 18:
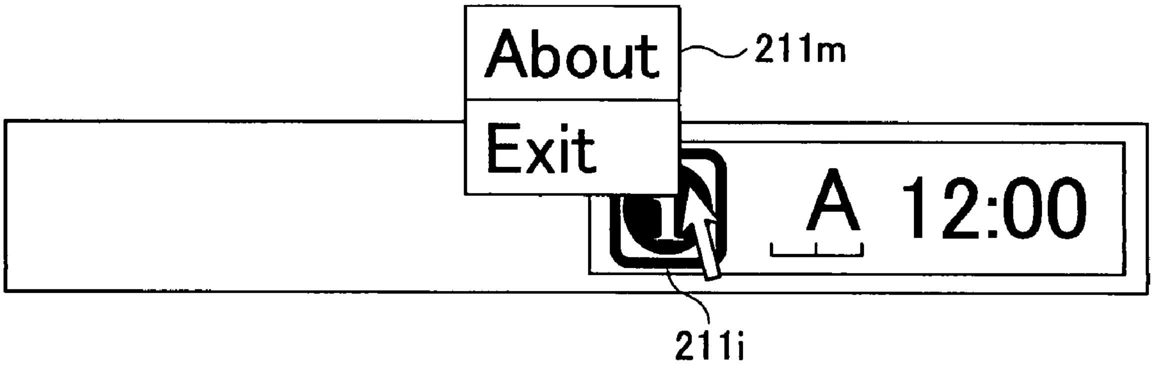
FIG. 18 is an example of an icon of a UI application on a task bar.

FIG. 18 is an example of an icon of the UI application 211. As shown in FIG. 18, an icon 2111 is an icon of the UI application 211. The UI application 211 appears as an icon on the task bar when it is started up. When the icon 2111 is double-clicked with the left button of a mouse, a GUI of the UI application 211 is displayed. When the icon 2111 is clicked with the right button of a mouse, a context menu 211*m* is displayed.

Figure 19:
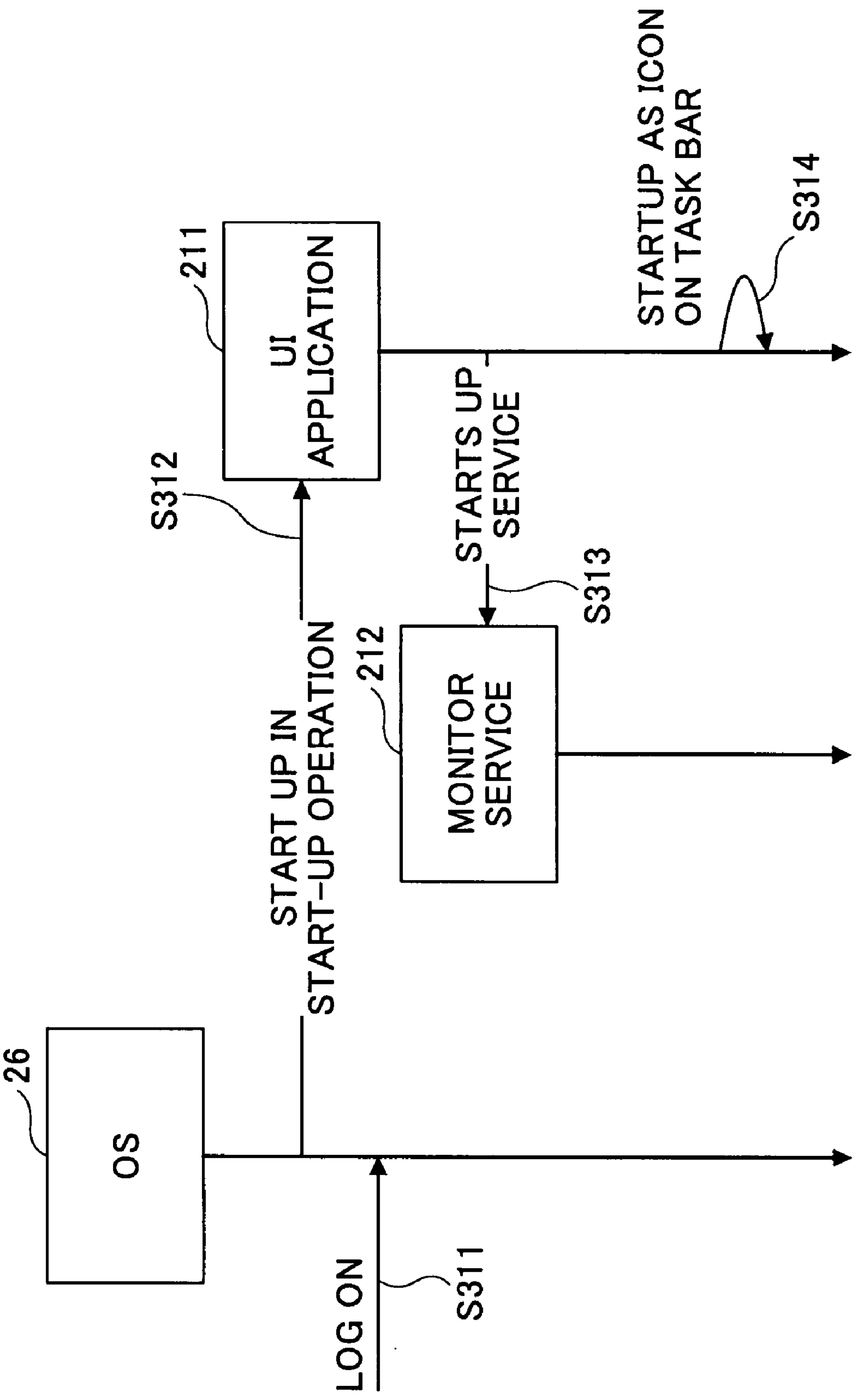
FIG. 19 is a sequence diagram for describing a start-up process in which the monitor service is not started up as the client PC is booted.

FIG. 19 is a sequence diagram for describing a start-up process in which the monitor service 212 is not started up as the client PC 20 is booted.

When the client PC 20 is booted and the OS 26 is waiting for a user to log on, as the user logs on (step S311) the OS 26 starts up the UI application 211 as a process in executing a start-up operation (step S312). As the user logs on, an individual environment for the user to access software resources is established. Accordingly, the user can access the software resources of the client PC 20. When it is confirmed that the monitor service 212 is not started up, the UI application 211 starts up the monitor service 212 (step S313). This is because the monitor service 212 needs to be started up for the UI application 211 to perform operations. Then, the UI application 211 displays its icon 2111 (refer to FIG. 18) on the task bar (step S314).

Figure 20:
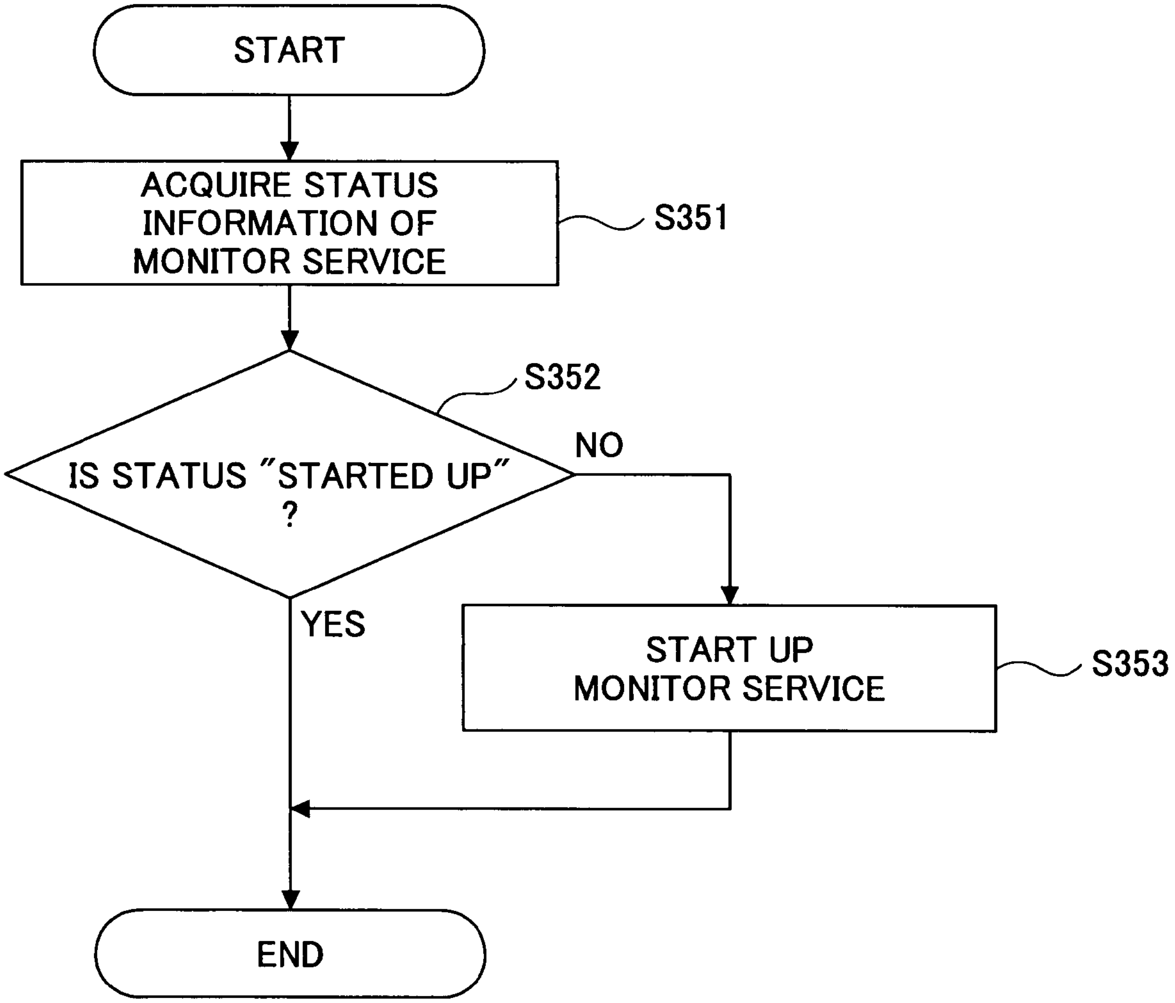
FIG. 20 is a flowchart for describing the process of starting up the UI application.

The UI application 211 executes the following application when it is started up by the OS 26. FIG. 20 is a flowchart for describing the process of starting up the UI application 211.

When the application 211 is started up by the OS 26, the UI application 211 acquires status information of the monitor service 212 (step S351), and determines whether the monitor service 212 is started up based on the status information (step S352). When the monitor service 212 is not started up (No in step S352), the UI application 211 starts up the monitor service 212 (step S353). When the monitor service 212 is already started up (Yes in step S352), the UI application 211 does not start up the monitor service 212. The status information can be requested from a Service Manager based on the service name of the monitor service 212. A process ID of the monitor service 212 can be acquired based on the program name of the monitor service 212. It can be determined that the monitor service 212 is not started up when a process ID cannot be successfully acquired.

Figure 21:
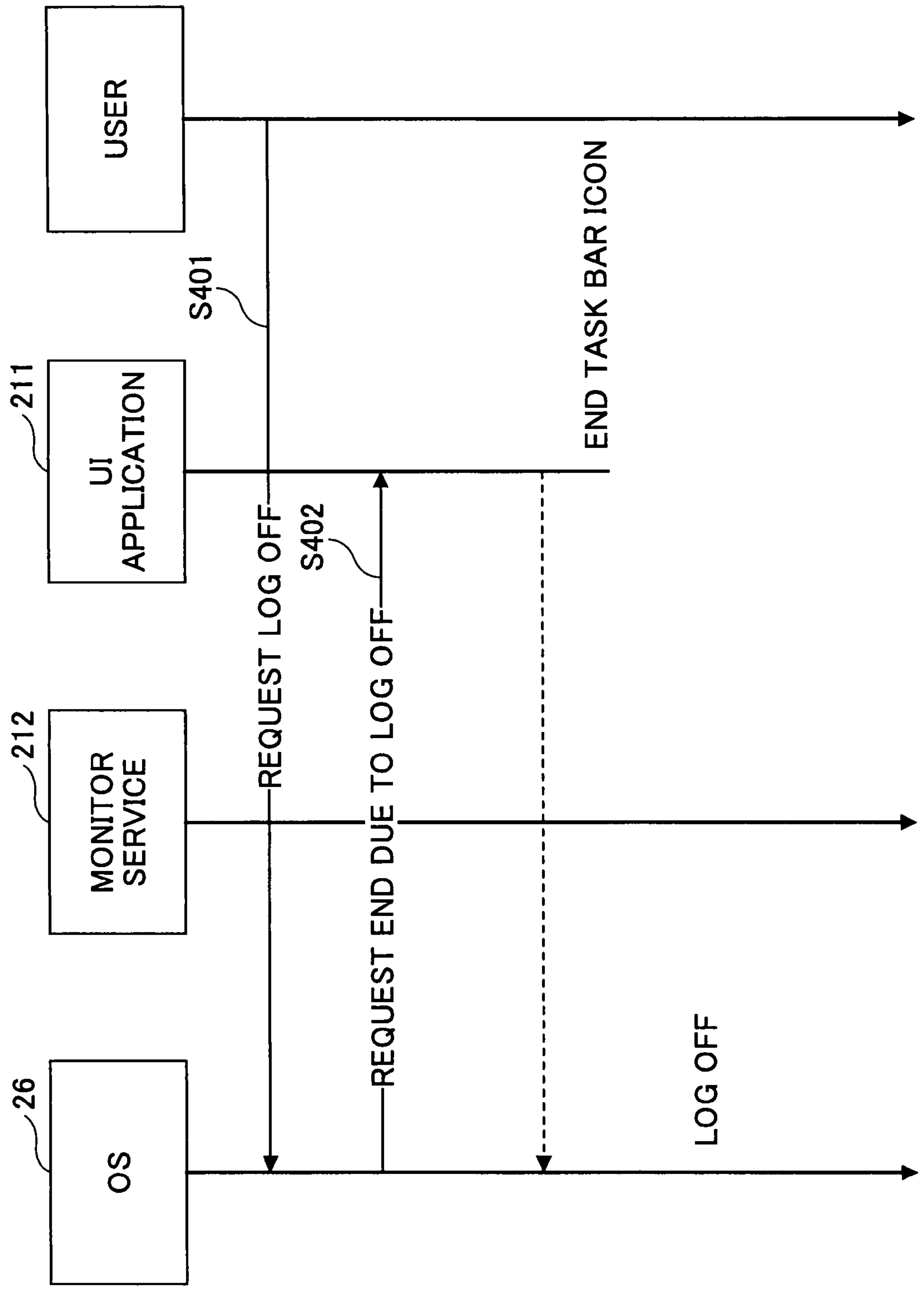
FIG. 21 is a sequence diagram for describing the ending process of the monitor program when a user logs off.

Next, an ending process of the monitor program 21 is described. FIG. 21 is a sequence diagram for describing the ending process of the monitor program 21 when the user logs off.

When the user logs off (step S401), the UI application 211 receives an end request from the OS 26 (step S402). When the end request is received, the UI application 211 ends its process. Accordingly, the icon 2111 on the task bar becomes hidden, and the individual environment for the user to access software resources ends (log off).

As shown in FIG. 18, by right-clicking the icon 211*i*, the context menu 211*m* is displayed. The context menu 211*m* includes an item "Exit" as one of the menu items. The item "Exit" is a menu item for ending the program causing the icon 2111 to be displayed, i.e., the UI application 211. Next, a description is given of a process for ending the monitor program 21 when the "Exit" item is selected.

Figure 22:
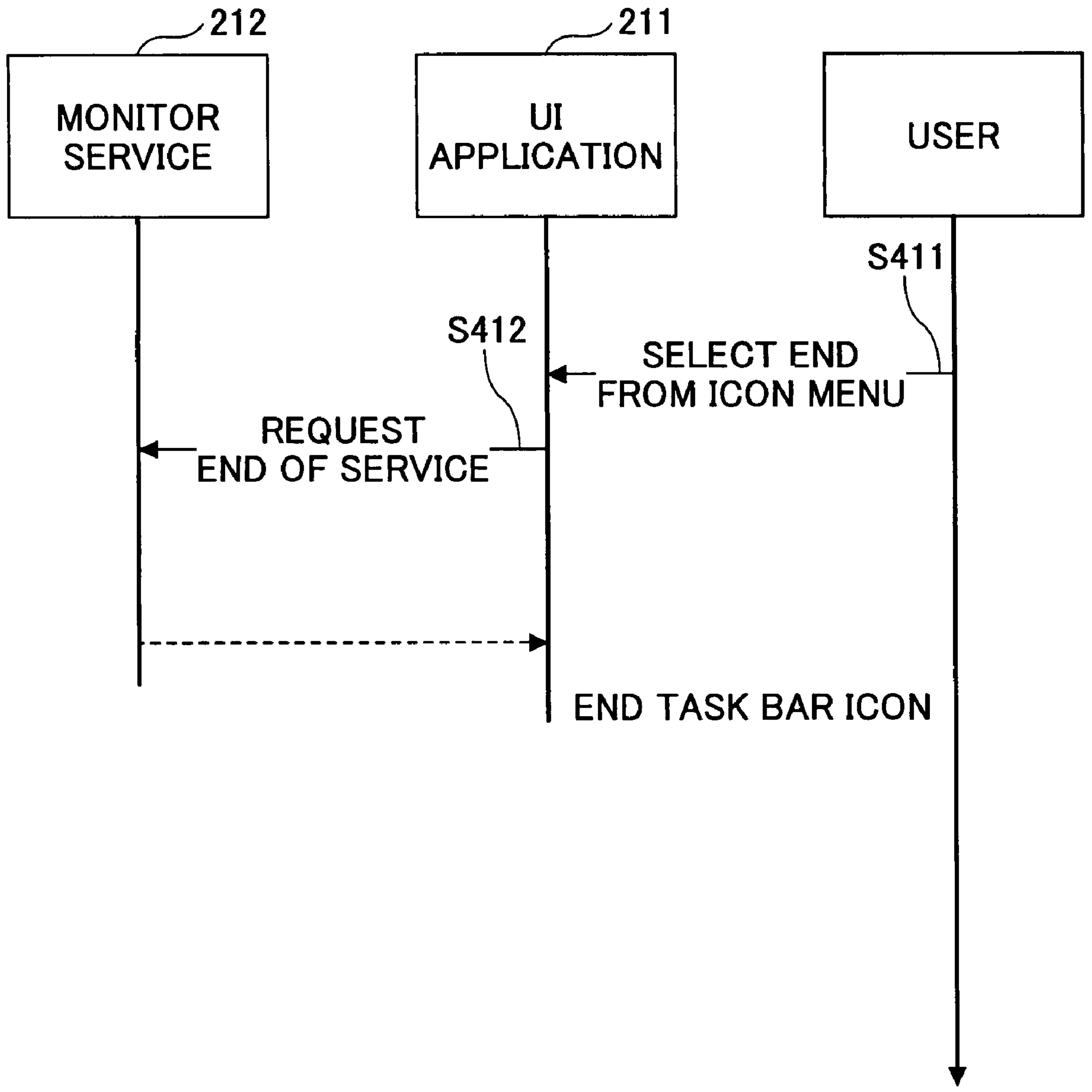
FIG. 22 is a sequence diagram for describing the process for ending the monitor program when an instruction is made to end the UI application with a context menu.

FIG. 22 is a sequence diagram for describing the process for ending the monitor program 21 when an instruction is made to end the UI application 211 with the context menu 211*m*.

When the user right-clicks the icon 2111 and selects the "Exit" item included in the context menu 211*m*, the UI application 211 receives the end request (step S411). The UI application 211 ends the monitor service 212 (step S412), and then ends itself.

Figure 23:
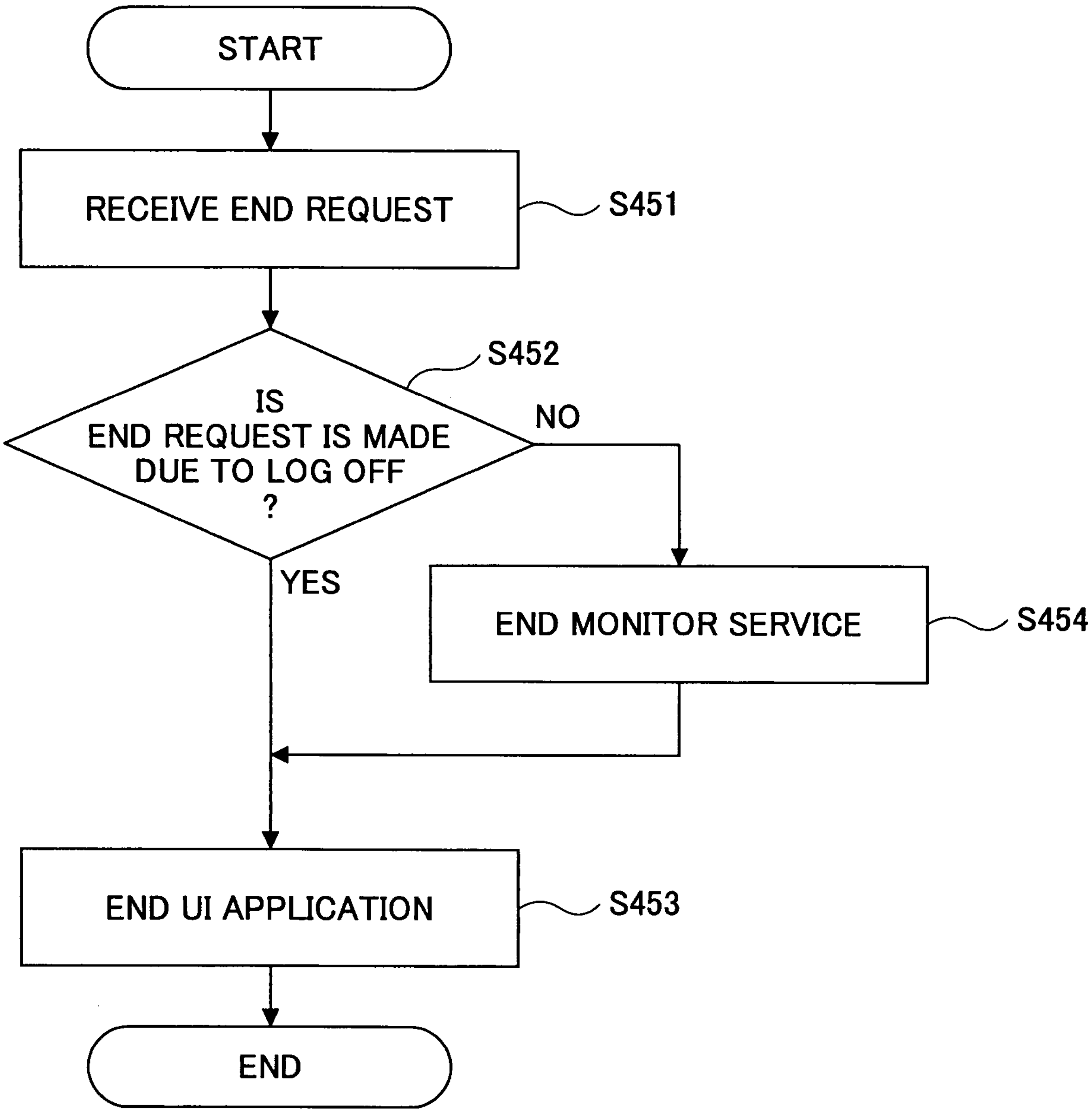
FIG. 23 is a flowchart for describing the process of ending the UI application.

When an end request is received, the UI application 211 executes the process below. FIG. 23 is a flowchart for describing the process of ending the UI application 211.

When an end request is received (step S451), the UI application 211 determines whether the end request is made due to log off (step S452). In the case of Windows®, if log off is executed, a LOG_OFF message is generated in the message procedure. The UI application 211 turns a flag ON when this LOG_OFF message is acquired. When an end request is subsequently received, if the flag is ON, the UI application 211 determines that the end request is made due to log off; if the flag is OFF, the UI application 211 determines that the end request is made due to another factor (such as selection of the "Exit" item).

If the end request is not made due to log off (No in step S452), the UI application 211 ends the monitor service 212 (step S454), and ends itself (step S453). On the other hand, if the end request is made due to log off (Yes in step S452), the UI application 211 ends itself without ending the monitor service 212 (step S453).

As described above, if the log off is executed, the UI application 211 ends but the monitor service 212 does not end. The monitor service 212 continues to realize functions of acquiring device information and monitoring shortages of consumable elements. This is because it is not considered appropriate to end these functions due to a single user's log off. It is considered that the user that logs off does not intend to end the monitor service 212 by logging off.

On the other hand, if the UI application 211 ends due to a factor other than log off, the monitor service 212 also ends. A typical example is when an instruction to end the UI application 211 is made from the context menu 211*m* of the icon 211*i*. More specifically, although the icon 211*i* is only for the UI application 211, a user will most probably perceive the icon 211*i* as being for the entire monitor program 21 including both the UI application 211 and the monitor service 212. That is, a general user may not acknowledge or be aware of the difference in the processes of the UI application 211 and the monitor service 212, and may thus perceive the UI application 211 and the monitor service 212 as being a single application. Considering this point, if the user makes an end instruction from the context menu 211*m*, it can be assumed that the user intends to end all functions of the monitor program 21, i.e., the function of monitoring shortages in consumable elements. Thus, if the monitor program 21 is not ended in such a circumstance, there would be a discrepancy between the user's understanding and the actual status of the client PC 20. As a result, the user would receive shortage report e-mails while the user is thinking that the monitoring operation for the device 30 is supposed to have ended. Accordingly, in the present embodiment, the monitor service 212 does not end due to log off but ends due to factors other than log off.

The present invention is not limited to the specifically disclosed embodiment, and variations and modifications may be made without departing from the scope of the present invention.

The present application is based on Japanese Priority Patent Application No. 2006-152181, filed on May 31, 2006, and Japanese Priority Patent Application No. 2007-093636, filed on Mar. 30, 2007, the entire contents of which are hereby incorporated by reference.

What is claimed is:

1. An information processing apparatus comprising:

an information processing unit configured to operate as a daemon process; and an information displaying unit configured to operate as a process different from the daemon process and display a screen relevant to the information processing unit;

wherein: as the information displaying unit is started up, the information displaying unit starts up the information processing unit; and wherein: the information processing unit acquires device information of a device connected to the information processing apparatus via a network and status information of a consumable element used by the device, determines whether the consumable element is lacking based on the status information of the consumable element, and sends, to an order support apparatus, the device information and the status information relevant to the consumable element that is determined as lacking.

2. The information processing apparatus according to claim 1, wherein:

as the information displaying unit is started up, the information displaying unit determines whether the information processing unit is started up, and starts up the information processing unit in the event that the information processing unit is not started up.

3. An information processing apparatus comprising:

an information processing unit configured to operate as a daemon process;

an information displaying unit configured to operate as a process different from the daemon process and display a screen relevant to the information processing unit;

a first ending unit configured to end the information displaying unit due to a first factor; and a second ending unit configured to end the information displaying unit due to a second factor different from the first factor;

wherein: the information displaying unit ends the information processing unit in the event of receiving a request to end from the first ending unit and the information displaying unit does not end the information processing unit in the event of receiving a request to end from the second ending unit; and wherein: the information processing unit acquires device information of a device connected to the information processing apparatus via a network and status information of a consumable element used by the device, determines whether the consumable element is lacking based on the status information of the consumable element, and sends, to an order support apparatus, the device information and the status information relevant to the consumable element that is determined as lacking.

4. The information processing apparatus according to claim 3, wherein:

the first ending unit is started up in the event that a menu item for instructing to end the information displaying unit is selected.

5. The information processing apparatus according to claim 4, wherein:

the menu item is displayed by clicking an icon indicating that the information displaying unit is operating as the process.

6. The information processing apparatus according to claim 3, wherein:

the second ending unit is started up in the event that an individual environment ends, wherein the individual environment enables a user to operate software resources of the information processing apparatus.

7. The information processing apparatus according to claim 6, wherein:

the second ending unit is started up in the event that the user logs off from the individual environment.

8. A process control method executed by a computer, the process control method comprising:

a first start-up step of starting up an information processing program configured to operate as a daemon process; and a second start-up step of starting up an information displaying program configured to operate as a process different from the daemon process and display a screen relevant to the information processing program;

wherein: in the second start-up step, the information displaying program executes the first start-up step; and wherein: the information processing program has a function of acquiring device information of a device connected to the computer via a network and status information of a consumable element used by the device, determining whether the consumable element is lacking based on the status information of the consumable element, and sending, to an order support apparatus, the device information and the status information relevant to the consumable element that is determined as lacking.

9. The process control method according to claim 8, wherein:

as the information displaying program is started up, the information displaying program has a function of determining whether the information processing program is started up, and starting up the information processing program in the event that the information processing program is not started up.

10. A process control program product comprising instructions for causing a computer to perform the steps of the process control method according to claim 8.

11. A process control method executed by a computer, the process control method comprising:

a first start-up step of starting up an information processing program configured to operate as a daemon process;

a second start-up step of starting up an information displaying program configured to operate as a process different from the daemon process and display a screen relevant to the information processing program;

a first ending step of ending the information displaying program due to a first factor; and a second ending step of ending the information displaying program due to a second factor different from the first factor;

wherein: the information displaying program has a function of ending the information processing program in the event of receiving a request to end in the first ending step and the information displaying program has a function of not ending the information processing program in the event of receiving a request to end in the second ending step; and wherein: the information processing program has a function of acquiring device information of a device connected to the computer via a network and status information of a consumable element used by the device, determining whether the consumable element is lacking based on the status information of the consumable element, and sending, to an order support apparatus, the device information and the status information relevant to the consumable element that is determined as lacking.

12. The process control method according to claim 11, wherein:

the first ending step is executed in the event that a menu item for instructing to end the information displaying program is selected.

13. The process control method according to claim 12, wherein:

the menu item is displayed by clicking an icon indicating that the information displaying program is operating as the process.

14. The process control method according to claim 11, wherein:

the second ending step is executed in the event that an individual environment ends, wherein the individual environment enables a user to operate software resources of the computer.

15. The process control method according to claim 14, wherein:

the second ending step is executed in the event that the user logs off from the individual environment.

16. A process control program product comprising instructions for causing a computer to perform the steps of the process control method according to claim 11.

* * * * *